United States Patent
Kim et al.

(10) Patent No.: US 10,227,442 B2
(45) Date of Patent: Mar. 12, 2019

(54) OPTICAL RESIN COMPOSITION AND OPTICAL LENS USING SAME

(71) Applicant: KS LABORATORIES CO., LTD., Suncheon (KR)

(72) Inventors: Keun Sik Kim, Suncheon (KR); Yeon Tak Choi, Suncheon (KR)

(73) Assignee: KS LABORATORIES CO., LTD., Suncheon (KR)

( * ) Notice: Subject to any disclaimer, the term of this patent is extended or adjusted under 35 U.S.C. 154(b) by 0 days.

(21) Appl. No.: 15/326,239

(22) PCT Filed: Jul. 14, 2015

(86) PCT No.: PCT/KR2015/007299
§ 371 (c)(1),
(2) Date: Jan. 13, 2017

(87) PCT Pub. No.: WO2016/010342
PCT Pub. Date: Jan. 21, 2016

(65) Prior Publication Data
US 2017/0198083 A1    Jul. 13, 2017

(30) Foreign Application Priority Data

Jul. 14, 2014    (KR) ........................ 10-2014-0088312

(51) Int. Cl.
*C08G 18/70* (2006.01)
*G02B 1/04* (2006.01)
(Continued)

(52) U.S. Cl.
CPC .......... *C08G 18/3876* (2013.01); *C08G 18/70* (2013.01); *C08G 18/72* (2013.01);
(Continued)

(58) Field of Classification Search
CPC .. C08G 18/3876; C08G 18/725; C08G 18/73; C08G 18/79; C08G 18/72; C08G 18/70; G02B 1/04; G02B 3/00
See application file for complete search history.

(56) References Cited

U.S. PATENT DOCUMENTS

2009/0030170 A1*  1/2009  Ryu ................... C08G 18/3868
528/65

FOREIGN PATENT DOCUMENTS

JP    2000-108219 A    4/2000
JP    2003-098301 A    4/2003
(Continued)

OTHER PUBLICATIONS

International Search Report for International Patent Application No. PCT/KR2015/007299, dated Jul. 14, 2015.

*Primary Examiner* — Michael L Leonard

(57) ABSTRACT

The present invention provides an optical polymerizable composition, an optical composition, a large-area window, a polyisocyanate composition, and eyeglass lens and producing method thereof. The optical polymerizable composition is composed of a polythiol compound and a polyisocyanate compound, and a urethane-based optical lens obtained by reacting the compounds has a low specific gravity and thus is lightweight, and has excellent heat resistance, and particularly, problems of degradation in impact resistance which appear after hard-multi coating are solved. The lens produced using the composition has various excellent optical characteristics including workability such as formability and dyeability, transparency and the like.

11 Claims, 4 Drawing Sheets

(51) Int. Cl.
  *C08G 18/38* (2006.01)
  *C08G 18/79* (2006.01)
  *C08G 18/72* (2006.01)
  *G02B 3/00* (2006.01)
  *C08G 18/73* (2006.01)
  *C08K 5/00* (2006.01)
  *G02B 5/20* (2006.01)
  *G02B 5/22* (2006.01)
  *G02C 7/10* (2006.01)
  *C08G 18/75* (2006.01)
  *C08G 18/78* (2006.01)
  *G02C 7/12* (2006.01)

(52) U.S. Cl.
  CPC ........... *C08G 18/725* (2013.01); *C08G 18/73* (2013.01); *C08G 18/755* (2013.01); *C08G 18/758* (2013.01); *C08G 18/7831* (2013.01); *C08G 18/79* (2013.01); *C08K 5/0091* (2013.01); *G02B 1/04* (2013.01); *G02B 1/041* (2013.01); *G02B 3/00* (2013.01); *G02B 5/208* (2013.01); *G02B 5/223* (2013.01); *G02C 7/108* (2013.01); *G02C 7/102* (2013.01); *G02C 7/12* (2013.01)

(56) References Cited

FOREIGN PATENT DOCUMENTS

| KR | 10-0689867 B1 | 3/2007 |
| KR | 10-0704314 B1 | 4/2007 |
| KR | 10-2008-0000615 A | 1/2008 |

\* cited by examiner

[Fig. 1]
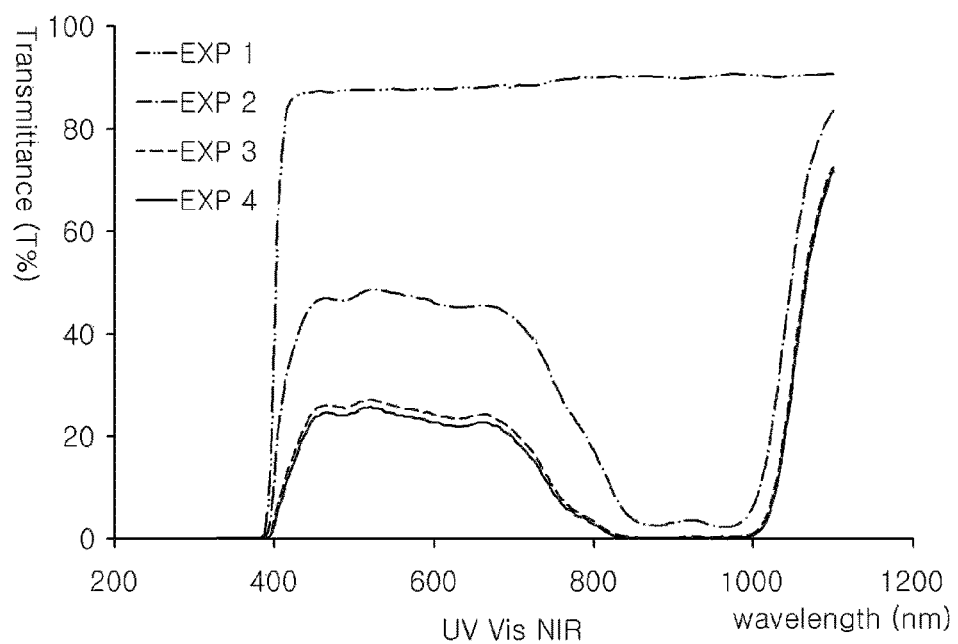
[Fig. 2]
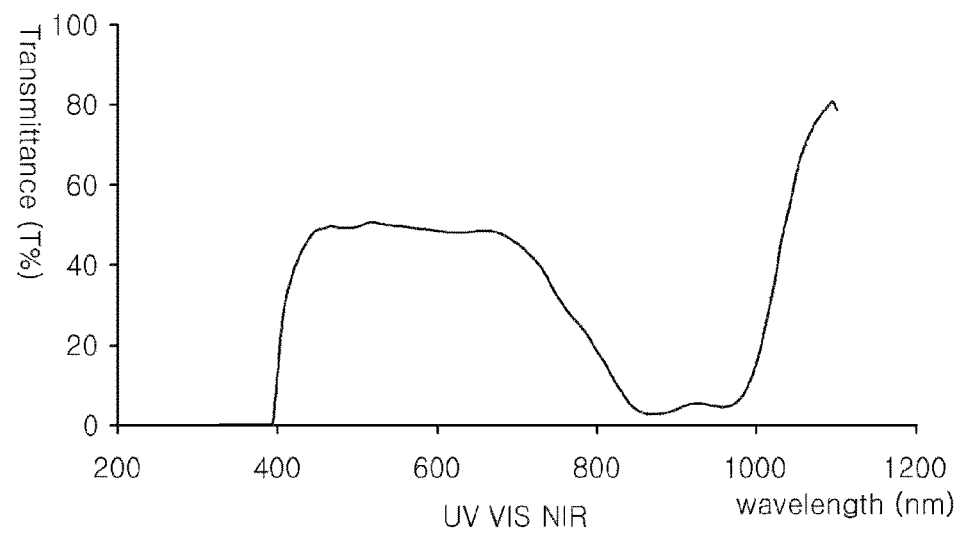

[Fig. 3]
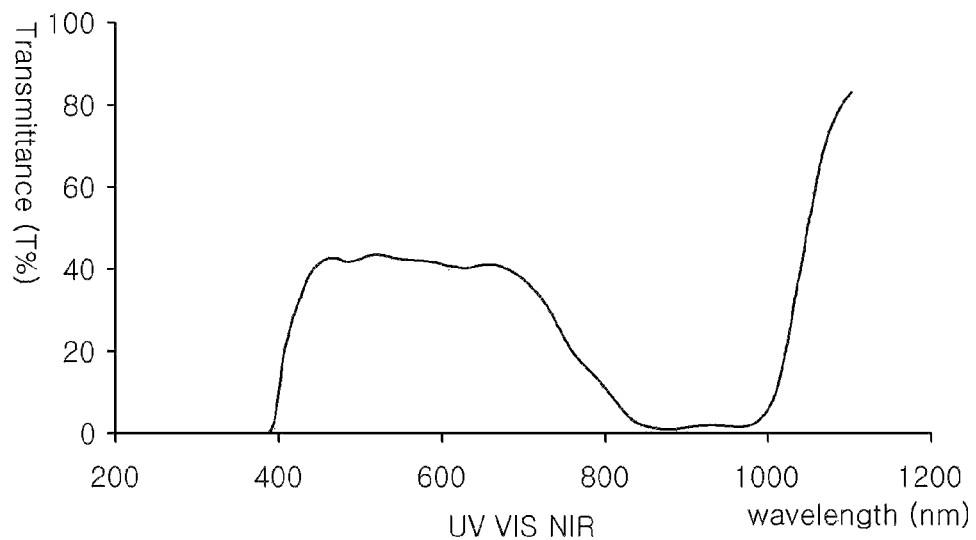
[Fig. 4]
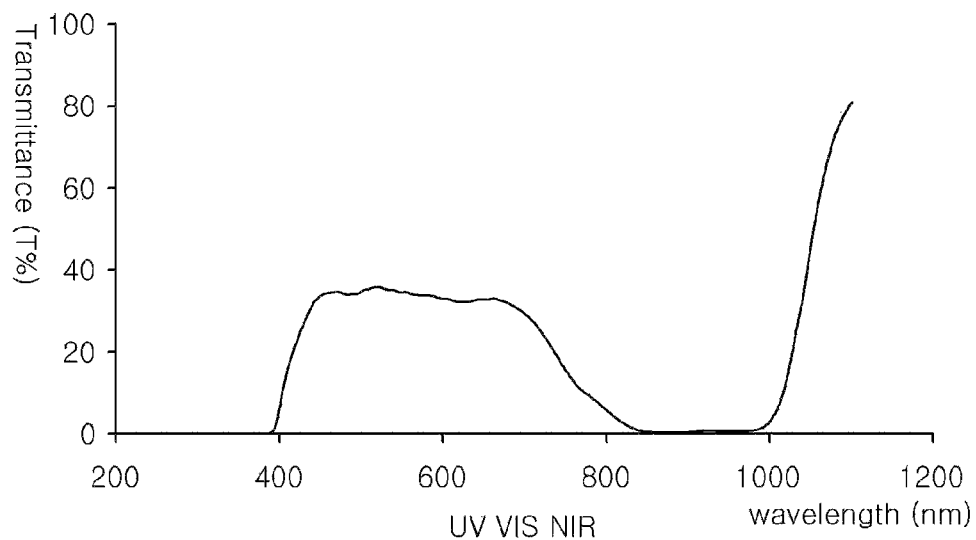

[Fig. 5]
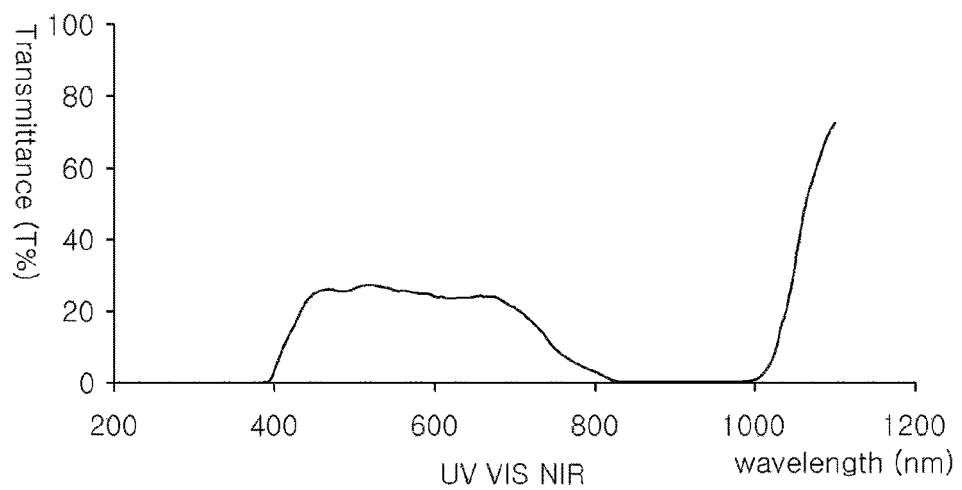
[Fig. 6]
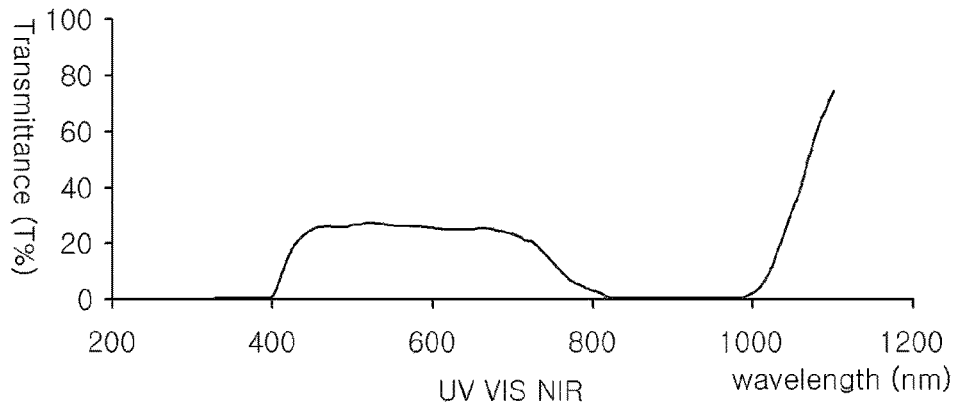

[Fig. 7]
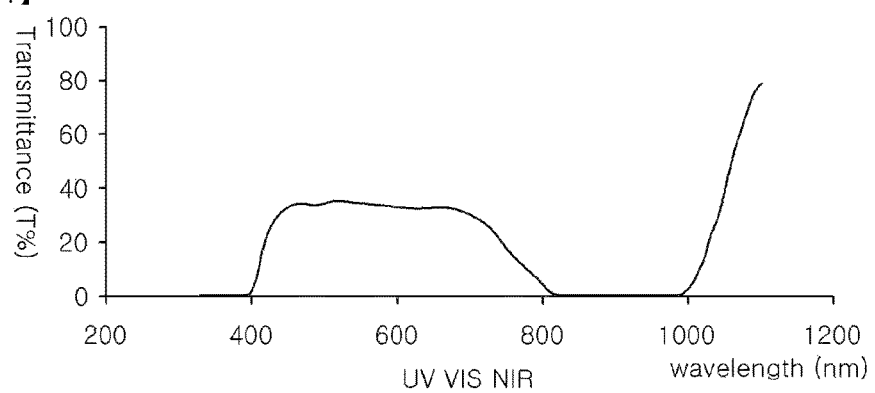

OPTICAL RESIN COMPOSITION AND OPTICAL LENS USING SAME

CROSS-REFERENCE TO RELATED APPLICATION

This application is a U.S. National Stage of International Patent Application No. PCT/KR2015/007299 filed Jul. 14, 2015, which claims the benefit of Korean Patent Application No. 10-2014-0088312, filed on Jul. 14, 2014, in the Korean Intellectual Property Office, the entire disclosure of which is incorporated herein in its entirety by reference.

TECHNICAL FIELD

Field of the Invention

The present invention relates to a polymerizable composition for polyurethane optical lenses, and more particularly, to an optical resin composition capable of blocking UV light at wavelength of 400 nm or less and/or near-infrared light at a wavelength of 800 nm to 1000 nm. In addition, the present invention relates to an optical product using the composition, and a lens, an eyeglass lens and the like, which include the optical product.

Background Art

A glass lens, which has been widely used as an optical lens for a long time, has merits in that the glass lens undergoes less change in lens power caused by external temperature change due to low coefficient of thermal expansion thereof and a multilayer formed on a surface of the glass lens to improve transmittance of the glass lens is less likely to break upon temperature change. However, since a glass lens is vulnerable to impact and has high specific gravity, the glass lens is recently being replaced by a lightweight plastic lens, excellent impact resistance and excellent processability, such as dyeability.

Since a plastic optical material is lighter and less likely to break and has better dyeability than an optical material including a glass lens, which is a kind of inorganic lens, plastic optical materials have quickly come into widespread use in optical materials, such as eyeglass lenses and camera lenses. A resin for optical materials has been required to have higher properties. Specifically, a resin for optical materials has been required to have higher index of refraction, higher Abbe number, lower specific gravity, higher heat resistance, and the like. Due to such requirements, various resins for optical materials have been developed and used.

In addition, as the demand for transmittance and stability level of a plastic lens increases, most optical lenses, particularly, eyeglass lenses, exhibit increased transmittance by performing multi-coating ($SiO_2$, $ZrO_2$) on both surfaces of the lenses. However, such multi-coating has a problem in that a lens is likely to break since externally applied impact is concentrated on one spot.

Regarding plastic optical materials, proposals relating to a polyurethane resin have been actively made, and a poly(thio)urethane composition is disclosed in Korean Patent No. 0704314, Korean Patent Publication Nos. 2008-0000615, 2010-0094378 and 2010-0120083, and the like.

When a plastic eyeglass lens produced from a copolymer of diarylisophthalate, dihydric alcohol-added diarylisophthalate and diethylene glycol bisaryl carbonate, which is disclosed in Korean Patent Publication No. 1992-0004464, or a copolymer of xylene diisocynate, 1,2-bismercaptoethyl-3-mercaptopropane and polymethylmethacrylate, which is disclosed in Korean Patent Publication No. 1994-004010, is subjected to multi-coating to improve transmittance thereof, there is a problem in that the plastic eyeglass lens is likely to break.

In addition, an injection-molded polycarbonate optical lens, which corresponds to a thermoplastic resin, suffers from severe deformation due to heat during use thereof despite relatively good impact resistance thereof after multi-coating, and suffers from the severer deformation in a central portion thereof than at an edge thereof, the central portion having a lower thickness than the edge. Thus, there are problems in that such an optical lens causes eye dizziness when a person wears the optical lens as an eyeglass lens, and that the optical lens suffers from reduction in Abbe number, which is an important optical property.

To solve problems related to thermal stability of a lens produced from the thermoplastic resin set forth above, a resin for thermally crosslinkable plastic lenses has been proposed as an alternative thereto and a method of producing an optical lens by mixing a modified polyol and diisocyanate is disclosed in Korean Patent Nos. 10-0638194 and 10-0688698. However, although such an optical lens has somewhat improved impact resistance and heat resistance, a monomer composition liquid for casting the lens is extremely slowly injected into a glass mold due to high viscosity thereof; the lens suffers from a lot of defects caused by bubbling after thermal curing since it is difficult to remove bubbles generated upon injection; and an injection mark remains on the lens. In addition, there are problems in that the optical lens set forth above suffers from a lot of defects caused by polymerization imbalance, and that an edge of the lens has high thickness since the lens has a low index of refraction of about 1.523.

In Korean Patent No. 10-0472837, an optical lens is produced by adding a dihydric alcohol to diisocyanate, mixing and reacting these components with a tetravalent polythiol, and then thermally curing the resulting material, thereby improving impact strength of the lens. However, despite exhibiting improved impact strength in a raw product state (non-post-processed plastic lens), an optical lens composition according to this patent does not satisfy FDA standards due to deterioration in impact resistance thereof after being subjected to multi-coating. Although satisfying strength for making a rimless eyeglass lens, this optical lens composition is unsatisfactory as an impact-safe eyeglass lens. In addition, since a monomer composition for optical lenses is prepared by adding the dihydric alcohol to diisocyanate in advance, there is also a problem in that this optical lens composition suffers from a lot of defects due to high viscosity thereof.

Korean Patent No. 10-0771176 discloses an impact resistant optical lens produced by reacting a tetravalent polythiol with diisophorone diisocyanate (IPDI) and hexamethylene diisocyanate (HDI). Although the produced optical lens exhibits enough impact resistance to pass FDA impact resistance pre-testing (127 cm, 16.3 g) in a raw product state and even after multi-coating, the optical lens fails to pass industrial safety eyeglass lens standards (ANS standards 127 cm, 67 g).

Korean Patent No. 10-0939452 discloses a resin composition for plastic eyeglass lenses, which includes 38% by weight (wt %) to 68 wt % of (a) one or more trivalent thiol ester compounds and 32 wt % to 62 wt % of (b) a (di)isocyanate mixture comprising hexamethylene diisocyanate (HDI) and the like, and which exhibits heat resistance and impact resistance after being subjected to multi-coating. However, this composition is for medium refractivity lenses having an index of refraction of about 1.546 to about 1.548, and a high-power lens produced therefrom has a drawback of having high thickness at an edge thereof. In addition, this composition has impact resistance corresponding to impact energy of 1.5 J and thus is not suitable to be used for eyeglass lenses for sports goggles, protective goggles for dangerous work, and the like.

In particular, Korean Patent Publication No. 2008-0000615 discloses a polythiourethane resin obtained by polymerizing a polymerizable composition, which includes hexamethylene diisocyanate (HDI), a biuret or trimer compound of HDI, a polythiol, and the like. Although this document discloses that the resin has excellent dyeability and tensile strength, this document does not disclose impact resistance of the resin. However, since the typical resin set forth above also includes 2-mercaptoethanol, the resin exhibits significantly deteriorated workability upon thermal curing of a lens due to a severe stench thereof and has a significant problem in processing of a lens due to severe toxicity thereof.

Korean Patent No. 0704314 discloses an optical resin composition obtained by polymerizing (a) a mixture of hexamethylene diisocyanate (HDI), (b) a mixture of a component selected from pentaerythritol tetrakis(mercaptopropionate) and pentaerythritol tetrakis(mercaptoacetate) and a sulfur-containing aliphatic diisocyanate, and (c) a UV absorbent, a release agent and a polymerization initiator. This optical resin composition also has insufficient impact resistance to be used for purposes of industrial safety or sports in a raw product state (raw material of a plastic eyeglass lens), and particularly has a problem of exhibiting low impact resistance after multi-coating.

In addition, Korean Patent No. 10-0689867 discloses an optical resin composition comprising a UV absorbent, a release agent, a polymerization initiator, hexamethylene diisocyanate, isophorone diisocyanate, and pentaerythritol tetrakis(mercaptopropionate) or pentaerythritol tetrakis (mercaptoacetate). Like the optical resin composition in Korean Patent No. 0704314, this optical resin composition also has insufficient impact resistance to be used for purposes of industrial safety or sports in a raw product state (raw material of a plastic eyeglass lens), and particularly has a problem of exhibiting low impact resistance after multi-coating.

Eyeglasses or sunglasses serve to correct eyesight and to protect eyes from harmful light such as UV light or infrared light.

A method of adding an infrared absorbent blocking transmission of infrared light or a UV absorbent blocking transmission of UV light is applied to sunglasses blocking infrared light and UV light (for example, Japanese Patent Laid-Open Publication Nos. 2007-271744 and 2000-007871).

In particular, Japanese Patent No. 5166482 discloses an optical resin composition capable of blocking near-infrared light such that the resin composition has a transmittance of about 5% or less at a near-infrared wavelength of 800 nm to 1,000 nm. This document discloses a method of producing an eyeglass lens, including: mixing a polycarbonate resin with a phthalocyanine pigment (a) in a wavelength range of 800 nm to 850 nm, a phthalocyanine pigment (b) in a wavelength range of 950 nm to 1000 nm and a phthalocyanine pigment (c) in a wavelength range of 875 nm to 925 nm in a specific ratio; and melting and injection-molding the pigments together with the resin, and an eyeglass lens produced from the optical resin composition.

According to Japanese Patent No. 5166482, any resin exhibiting excellent transparency can be used. For example, the resin includes diethylene glycol bis-allylcarbonate (CR-39), polymethylmethacrylate (PMMA), methyl methacrylate (MMA) and the like, preferably a polycarbonate (PC). However, even though diethylene glycol bis-allyl carbonate (CR-39) disclosed in this document is a thermosetting resin and thus, has different properties from polycarbonate (PC), that is, a thermoplastic resin, and is unable to be melted and injection-molded into a cavity in a mold, this document merely discloses diethylene glycol bis-allyl carbonate (CR-39) as being equivalent to other thermoplastic resins.

DISCLOSURE

Technical Problem

The present invention is conceived to solve the above problems of typical optical compositions and it is one aspect of the present invention to provide an optical resin composition, which has better impact resistance than any polyurethane eyeglass lens resins produced by injection molding and maintains impact resistance even after multi-coating.

In addition, although polycarbonate (PC), which is a thermoplastic resin, is a resin capable of being melted at a high temperature of 250° C. or more, there is a concern that phthalocyanine known as a near-infrared absorbent can be thermally decomposed upon injection molding together with such a thermoplastic resin. Further, there is a drawback such as difficulty in uniform distribution of the absorbent in a high-viscosity melted resin of a polycarbonate having a certain molecular weight. Therefore, to prepare an optical resin composition for blocking infrared light using phthalocyanine, the optical resin composition is required to be cured by mold polymerization, which is a mold injection method, at relatively low temperature allowing phthalocyanine not to be thermally decomposed.

Technical Solution

In accordance with one aspect of the present invention, there is provided an optical polymerizable composition composed of a polyurethane resin and having excellent impact resistance, the optical polymerizable composition comprising: (1) a polyisocyanate mixture corresponding to a liquid (I) and including (a) a biuret compound (Biuret) of an aliphatic isocyanate, (b) a compound of 1,6-hexamethylene diisocyanate (HDI), and (c) isophorone diisocyanate (IPDI); and (2) a polythiol such as 2,3-bis(2-mercaptoethylthio)-propane-1-thiol (GST), pentaerythritol tetrakis(mercaptopropionate) (PEMP), 1,3-bis(2-mercaptoethylthio)-propane-2-thiol (MET), and (3,6,10,13-tetrathiapentadecane-1,8,15-trithiol) (SET), the polythiol being a polythiol compound (component (d)) corresponding to a liquid (II).

In accordance with another aspect of the present invention, there is provided an optical composition for blocking electromagnetic waves, which includes a mixture of a polyurethane thermosetting resin composition and an electromagnetic wave absorbent, the optical composition comprising: (1) at least one polyisocyanate compound corresponding to a liquid (I); (2) at least one polythiol compound corresponding to a liquid (II); and (3) a near-infrared absorbent acting as an electromagnetic wave absorbent and having high near-infrared absorption capabilities corresponding to a transmittance of less than 5% at a wavelength of about 800 nm to about 1000 nm.

Advantageous Effects

An eyeglass lens obtained from a composition for optical lenses according to the present invention has excellent heat resistance and impact resistance, which satisfies FDA eyeglass lens standards (ANS standards, 127 cm height, 16.0 g, drop ball pre-test) and industrial safety standards (ANS standards, 127 cm height, 67 g, drop ball pre-test). A lens according to the present invention can have sufficient strength even without a primer coating process. In particular, the lens according to the present invention can be used as a lens for industrial safety in industrial sites and as a lens for sports goggles and thus have an extremely wide application range.

In addition, according to the present invention, a sunglass (eyeglass) lens can effectively block near-infrared light having a wavelength of 800 nm to 1000 nm and UV light having a wavelength of 400 nm or less, thereby effectively protecting eyes from UV light and infrared light contained in sunlight.

DESCRIPTION OF DRAWINGS

FIG. 1 is a graph depicting typical UV-VIS-NIR absorption spectra of near-infrared blocking lenses as obtained by evaluating near-infrared absorption capabilities of the lenses, in which a curve EXP-1 is a spectrum obtained when only a UV absorbent is used; a curve EXP-2 is a spectrum obtained when the UV absorbent and 500 ppm of a near-infrared absorbent are used; a curve EXP-3 is a spectrum obtained when the UV absorbent and 800 ppm of the near-infrared absorbent are used; and a curve EXP-4 is a spectrum obtained when the UV absorbent and 1000 ppm of the near-infrared absorbent are used.

FIGS. 2 to 4 are graphs depicting UV-Vis-NIR absorption spectra of lenses prepared in Examples 7 to 9, respectively, as obtained by evaluating near-infrared absorption capabilities of the lenses.

FIGS. 5 to 7 are graphs depicting UV-Vis-NIR absorption spectra of lenses prepared in Examples 10 to 12, respectively, as obtained by evaluating near-infrared absorption capabilities of the lenses.

BEST MODE

Hereinafter, embodiments of the present invention will be described in detail with reference to the accompanying drawings.

Generally, a polyurethane impact resistant eyeglass lens includes an optical polyurethane resin prepared by mixing a polyisocyanate corresponding to a liquid (I) with a polyol or polythiol corresponding to a liquid (II), degassing the mixture, and then polymerizing the mixture. Since an isocyanate (—NCO) and a polyol (—OH) or polythiol (—SH) are likely to be polymerized when mixed, the liquid (I) and the liquid (II) need to be separately prepared and stored, and the two liquids need to be mixed, immediately injected into a mold, and then polymerized by a curing program to obtain a lens-shaped resin, upon lens polymerization. Therefore, the liquid (I) and the liquid (II) need to be separately prepared and stored.

In accordance with one aspect of the present invention, in order to prepare an optical polymerizable composition, there is provided a mixture used as a polyisocyanate corresponding to a liquid (I), the mixture comprising:

(a) an aliphatic isocyanate compound (Biuret) represented by Formula (1):

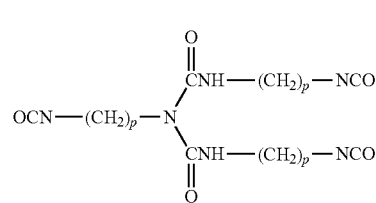

[Formula (1)]

(where p is an integer of 2 to 10);

(b) a compound of 1,6-hexamethylene diisocyanate (HDI); and (c) at least one diisocyanate compound selected from the group consisting of isophorone diisocyanate (IPDI), dicyclohexyl methane diisocyanate (H12MDI), 2,5(6)-bis(isocyanatemethyl)-bicyclo[2,2,1]heptane (NBDI), and octahydro-4,7-methano-1H-indenedimethyl diisocyanate (TCDI).

In accordance with another aspect of the present invention, in order to prepare an optical polymerizable composition, there is provided a compound or mixture used as a polythiol corresponding to a liquid (II), the compound or mixture comprising:

(d) at least one polythiol selected from the group consisting of 2,3-bis(2-mercaptoethylthio)-propane-1-thiol (GST), 1,3-bis(2-mercaptoethylthio)-propane-2-thiol (MET), (3,6,10,13-tetrathiapentadecane-1,8,15-trithiol) (SET), pentaerythritol tetrakis(mercaptopropionate) (PEMP), 2-(2-mercaptoethylthio)propane-1,3-dithiol (GMT), and 4,8-dimercaptomethyl-1,11-dimercapto-3,6,9-trithiaundecane (DMDDU).

In the optical polymerizable composition according to the present invention, in the polyisocyanate (NCO) compound of the liquid (I), the components (a), (b) and (c) may be present in a weight ratio (Biuret:HDI:IPDI) of 30 to 40:20 to 30:30 to 40. In addition, in the polythiol (SH) of liquid (II), the component (d) is a mixture of GST and PEMP, preferably a mixture in which GST and PEMP are mixed in a ratio of 90 wt % to 80 wt %:10 wt % to 20 wt %.

In addition, a functional group of the polyisocyanate (NCO) and a functional group of the polythiol (SH) are present in a mole ratio (NCO/SH) of 0.5 to 1.5, preferably 0.9 to 1.1.

To produce an eyeglass lens capable of effectively blocking UV light and/or near-infrared light, which are harmful electromagnetic waves, the polyurethane thermosetting resin composition according to the present invention as set forth above further includes a UV absorbent blocking UV light or a near-infrared absorbent, which is a solid obtained by mixing one or more pigments to block near-infrared light. However, since the near-infrared absorbent as a solid phase, a uniform absorbent solution is required to be prepared in advance by uniformly mixing the near-infrared absorbent with the polyisocyanate used in the liquid (I).

Since UV light as a shorter wavelength than visible light (400 nm to 800 nm) and only such short wavelengths need to be blocked, a UV absorbent known in the art is mixed with the optical composition. On the other hand, since infrared light has a longer wavelength than visible light, if an infrared absorbent unconditionally blocks infrared light, the infrared absorbent also blocks visible light unlike the UV absorbent, and thus a special absorbent is required to be used. In particular, the amount of the near-infrared absorbent is required to be finely adjusted such that the near-infrared absorbent blocks only a portion of visible light and provides a transmittance of 20% or more.

FIG. 1 is a graph depicting typical UV-VIS-NIR absorption spectrum analysis results of near-infrared blocking lenses, a Y-axis represents light transmittance (T %), and an X-axis represents wavelength (nm). In the graph of FIG. 1, a dashed double-dotted curve EXP-1 at the uppermost position shows that UV light having a wavelength of 400 nm or less is blocked by adding the UV absorbent added to the optical composition.

In addition, the other three curves EXP-2, EXP-3 and EXP-4 of FIG. 1 show that only a portion of visible light having a wavelength of 400 nm to 800 nm is blocked using both the UV absorbent and the near-infrared absorbent, and that lenses have a visible light transmittance of 10% to 20%. If a lens has a visible light transmittance of 0%, since light is not visible when a person wears the lens, a lens having higher transmittance is better. However, since a lens has an adverse effect of blocking visible light if a large amount of the near-infrared absorbent is added to the optical composition, it is necessary to add a suitable amount of the near-infrared absorbent.

In particular, the three curves of FIG. 1 are plotted according to concentration of the near-infrared absorbent, and the two curves EXP-3 and EXP-4 at lower positions show that the lenses have a transmittance of almost 0% in a near-infrared range (800 nm to 1000 nm) and block near-infrared light, and that the near-infrared light absorbent is present in an appropriate concentration in the optical composition according to the present invention.

In accordance with a further aspect of the present invention, there is provided an optical polymerizable composition comprising: a polyurethane thermosetting resin composition; and a near-infrared absorbent having high near-infrared absorption capabilities corresponding to a transmittance of less than 5% at a wavelength of 800 nm to 1000 nm, the near-infrared absorbent being one of electromagnetic wave absorbents. The near-infrared absorbent is a mixture of a plurality of phthalocyanine pigments having different structures and may be prepared by mixing the phthalocyanine pigments having a transmittance of less than 10% as minimum values of spectral transmittance curves in (i) a wavelength range of 800 nm to 850 nm, (ii) a wavelength range of 875 nm to 925 nm, and (iii) a wavelength range of 950 nm to 1000 nm, respectively.

In accordance with yet another aspect of the present invention, there is provided an optical polymerizable composition comprising: a polyurethane thermosetting resin composition; and at least one UV absorbent acting as another electromagnetic wave absorbent, absorbing UV light having a wavelength of 400 nm or less, and selected from the group consisting of:

2-(2'-hydroxy-5-methylphenyl)-2H-benzotriazole; 2-(2'-hydroxy-3',5'-di-t-butylphenyl)-5-chloro-2H-benzotriazole; 2-(2'-hydroxy-3'-t-butyl-5'-methylphenyl)-5-chloro-2H-benzotriazole; 2-(2'-hydroxy-3',5'-di-t-amylphenyl)-2H-benzotriazole; 2-(2'-hydroxy-3',5'-di-t-butylphenyl)-2H-benzotriazole; 2-(2'-hydroxy-5'-t-butylphenyl)-2H-benzotriazole; 2-(2'-hydroxy-5'-t-octylphenyl)-2H-benzotriazole; 2,4-dihydroxybenzophenone; 2-hydroxy-4-methoxybenzophenone; 2-hydroxy-4-octyloxybenzophenone; 4-dodecyloxy-2-hydroxybenzophenone; 4-benzyloxy-2-hydroxybenzophenone; 2,2',4,4'-tetrahydroxybenzophenone; and 2,2'-dihydroxy-4,4'-dimethoxybenzophenone.

In accordance with yet another aspect of the present invention, there is provided a method of producing an eyeglass lens for blocking electromagnetic waves by molding a mixture of a polyurethane thermosetting resin composition and an electromagnetic wave absorbent through mold polymerization, the method including:

(1) obtaining a liquid (I) of an optical composition comprising at least one polyisocyanate compound;

(2) obtaining a liquid (II) of an optical composition comprising at least one polythiol compound;

(3) obtaining a uniform electromagnetic wave absorbent solution by mixing the at least one polyisocyanate compound used in the liquid (I) with a near-infrared absorbent, a UV absorbent, or both thereof, the near-infrared absorbent having high near-infrared absorption capabilities corresponding to a transmittance of less than 5% at a wavelength of 800 nm to 1000 nm, and the UV absorbent having absorption capabilities of UV light with a wavelength of 400 nm or less; and (4) mold-polymerizing an optical composition prepared by mixing the obtained solution of the liquid (I), the liquid (II), and the electromagnetic wave absorbent solution.

According to the present invention, the biuret-form isocyanate compound, which is used as the compound of the component (a) and is represented by Formula (1), may be easily prepared from a raw material such as 1,2-ethylene diisocyanate, 1,3-propylene diisocyanate, 1,4-butylene diisocyanate, 1,6-hexamethylene diisocyanate, 1,7-heptamethylene diisocyanate, 1,8-octamethylene diisocyanate, 1,9-nonamethylene diisocyanate, and 1,10-decamethylene diisocyanate. In addition, the obtained compound may be purified before use or may include a raw material monomer itself, and the biuret-form isocyanate compound may include commercially available Desmodur N100 (Bayer Co., Ltd.) or Tolonate HDB LV (Perstop Co. Ltd.).

According to the present invention, 1,6-hexamethylene diisocyanate (abbreviated to HDI hereinafter), which is used as the compound of the component (b), is an alkylene diisocyanate compound, and may be prepared or commercially available.

According to the present invention, isophorone diisocyanate (abbreviated to IPDI hereinafter) and dicyclohexyl methane diisocyanate (abbreviated to H12MDI hereinafter), which may be used as the compound of the component (c), are alicyclic diisocyanate compounds. 2,5(6)-bis(isocyanatemethyl)-bicyclo[2,2,1]heptane (abbreviated to NBDI hereinafter) andoctahydro-4,7-methano-1H-indenedimethyl diisocyanate (abbreviated to TCDI hereinafter) are tricyclic alicyclic diisocyanate compounds. These diisocyanates may be synthesized or commercially available.

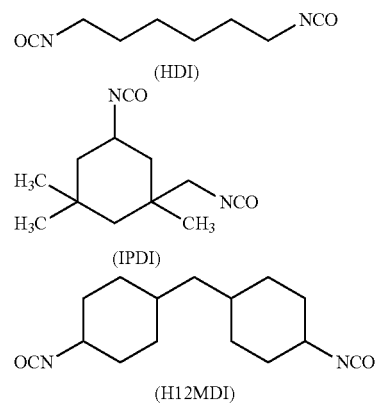

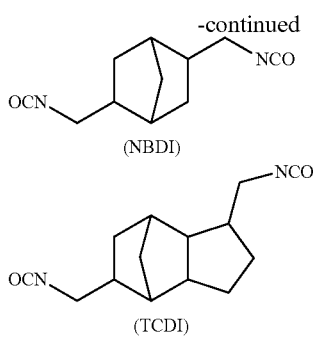

(NBDI)

(TCDI)

In addition, according to the present invention, the polythiol compound used as the compound of the component (d) may include 2,3-bis(2-mercaptoethylthio)-propane-1-thiol (GST), 1,3-bis(2-mercaptoethylthio)-propane-2-thiol (MET), (3,6,10,13-tetrathiapentadecane-1,8,15-trithiol) (SET), pentaerythritol tetrakis(mercaptopropionate) (PEMP), 2-(2-mercaptoethylthio)propane-1,3-dithiol (GMT), 4,8-dimercaptomethyl-1,11-dimercapto-3,6,9-trithiaundecane (DMDDU), and the like. Structures of these compounds are as follows.

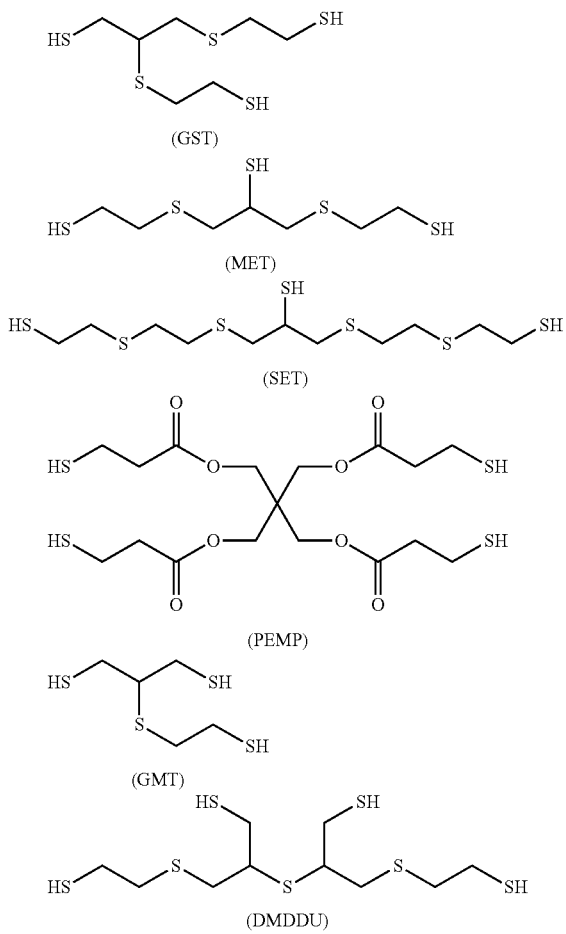

The polythiol compound may include the following compounds.

The polythiol compound may include one or two selected from the group consisting of polythiol compounds such as 1,2-bis(2-mercaptoethylthio)-3-mercaptopropane, trimethylolpropanetris(mercaptopropionate), pentaerythritoltetrakis(mercaptopropionate), 2,3-bis(2-mercaptoethylthio)propane-1-thiol, 2-(2-mercaptoethylthio)-3-[2-(3-mercapto-2-(2-mercaptoethylthio)-propylthio)ethylthio-propane-1-thiol, 2-(2-mercaptoethylthio)-3-{2-mercapto-3-[3-mercapto-2-(2-mercaptoethylthio)-propylthio]propylthio}-propane-1-thiol, trimethylolpropanetris(mercaptopropionate), trimethylolethanetris(mercaptopropionate), glyceroltris(mercaptopropionate), trimethylolchlorotris(mercaptopropionate), trimethylolpropanetris(mercaptoacetate), trimethylolethanetris(mercaptoacetate), pentaerythritoltetrakis(mercaptoacetate), [1,4]dithian-2-yl-methanethiol, 2-(2-mercapto-ethylsulfanyl)-propane-1,3-dithiol, 2-([1,4]dithian-2-ylmethylsulfanyl)-ethanethiol, 3-(3-mercapto-propionylsulfanyl)-propionic acid 2-hydroxylmethyl-3-(3-mercapto-propionyloxy)-2-(3-mercapto-propionyloxymethyl)-propylester, 3-(3-mercapto-propionylsulfanyl)-propionic acid 3-(3-mercapto-propionyloxy)-2,2-bis-(3-mercapto-propionyloxymethyl)-propylester, (5-mercaptomethyl-[1,4]dithian-2-yl)-methanethiol, (3,6,10,13-tetrathiapentadecane-1,8,15-trithiol) (SET), 2-(2-mercaptoethylthio)propane-1,3-dithiol (GMT), and 4,8-dimercaptomethyl-1,11-dimercapto-3,6,9-trithiaundecane (DMDDU).

Among the polythiol compounds set forth above, the polythiol compound according to the present invention preferably includes 2,3-bis(2-mercaptoethylthio)-propane-1-thiol (GST), (3,6,10,13-tetrathiapentadecane-1,8,15-trithiol) (SET), pentaerythritol tetrakis(mercaptopropionate) (PEMP), 2-(2-mercaptoethylthio)propane-1,3-dithiol (GMT), or 4,8-dimercaptomethyl-1,11-dimercapto-3,6,9-trithiaundecane (DMDDU). More preferably, the polythiol compound according to the present invention is a mixture of 2,3-bis(2-mercaptoethylthio)-propane-1-thiol (GST) and pentaerythritol tetrakis(mercaptopropionate) (PEMP).

Through preliminary examples, the inventors of the present invention found that the lens had extremely good impact resistance by adding the biuret compound used as the component (a) thereto. In addition, if an amount of 1,6-hexamethylene diisocyanate (HDI) of the diisocyanate mixture used as the component (b) was increased, the lens exhibited deteriorated heat resistance but improved impact strength. Further, it could be found that, if an amount of isophorone diisocyanate (IPDI) used as the component (c) was increased, the lens exhibited improved heat resistance but gradually deteriorated impact strength. Based on these results, various additional preliminary examples were performed to find the optimum amount of each of isophorone diisocyanate (IPDI) and 1,6-hexamethylene diisocyanate (HDI) in the resin composition for optical lenses according to the present invention by considering heat resistance and impact strength of the finally produced lens.

In particular, through a large number of repeated preliminary examples, the inventors of the present invention produced the polyurethane composition having excellent impact resistance as set forth above, and then found an optimum ratio of the component (a) to the component (b) to the component (c) according to the present invention by analyzing properties of a resin obtained from the polyurethane composition.

Since there is a tradeoff between impact strength and heat resistance, it was difficult to satisfy both properties at the same time. To supplement this problem, use of the isocyanate compound represented by Formula (1) allowed the lens to be given robustness through biuret and to have excellent durability and weather resistance. The inventors of the present invention supposed that these components caused various uniform crosslinking in an optical product, improving impact resistance of the optical product.

The inventors of the present invention produced a polythiourethane composition having excellent impact resistance by first polymerizing the component (a), the component (b), the component (c), and the component (d). The polythiourethane resin obtained by a method of preparing a polythiourethane resin according to the present invention had better impact resistance the typical resins, sufficient heat resistance, and excellent yellowing resistance, suffered from no whitening, and was lightweight due to a specific gravity of 1.22 to 1.25.

According to the present invention, the component (a) is present in an amount of 20 wt % to 50 wt %, preferably 30 wt % to 40 wt % in the isocyanate mixture of the component (a), the component (b) and the component (c), the isocyanate mixture being used as the liquid (I). If the amount of the component (a) is out of this range, the optical polymerizable composition has a difficulty in injecting the mixture into a mold due to high viscosity of the mixture, despite no problem in impact resistance. In addition, the component (b) is present in an amount of 10 wt % to 40 wt %, preferably 20 wt % to 30 wt %. If the amount of the component (b) is less than this range, the optical polymerizable composition has low impact resistance, and if the amount of the component (b) is greater than this range, the optical polymerizable composition has low heat resistance and suffers from yellowing, despite excellent impact resistance. In particular, the component (c) is present in an amount of 20 wt % to 50 wt %, preferably 30 wt % to 40 wt %. If the amount of the component (c) is outside of this range, the optical polymerizable composition has a problem in heat resistance. When H12NDI, NBDI, or TCDI is used instead of IPDI, the range of the amount of IPDI may be equally applied to an amount thereof.

According to the present invention, a mole ratio of a functional group (—NCO) of the polyisocyanate used as the liquid (I) to a functional group (—SH) of the polythiol used as the liquid (II) (NCO/SH) may range from 0.5 to 1.5. To further improve properties of the optical lens, the ratio of the functional group (—NCO) of the polyisocyanate to the functional group (—SH) of the polythiol preferably ranges from 0.9 to 1.1, and is more preferably 1.0.

The polyisocyanate may include Biuret, HDI, and IPDI in a weight ratio (Biuret:HDI:IPDI) of 30 to 40:20 to 30:30 to 40. When the polythiol includes only GST, a resin having a high index of refraction (nD) of 1.59 to 1.60 may be obtained, and when the polythiol includes only PEMP, a resin having an index of refraction (nD) of 1.55 to 1.56 may be obtained and thus used for a medium refractivity lens. Thus, the polythiol is not particularly limited. However, in order to produce a high refractivity lens, which has a high Abbe number of 39 to 48 and an index of refraction (nD) of 1.59 to 1.60 while exhibiting heat resistance and preventing whitening, yellowing and the like, the polythiol preferably includes GST and PEMP appropriately mixed therein. PEMP is present in an amount of 10 wt % to 20 wt %, preferably 14 wt % to 18 wt % in the polythiol. If the amount of PEMP is out of this range, the optical composition tends to have slightly reduced impact resistance, and if the amount of PEMP is greater than 20 wt %, the optical composition also has reduced index of refraction. Therefore, it is desirable that the amount of PEMP be suitably adjusted.

A lens resin produced from the composition according to the present invention has a specific gravity of 1.20 to 1.25 and thus is significantly lighter than typical polythiourethane lens resins having a specific gravity of 1.30 to 1.35. since like this, the specific gravity of the high refractivity lens can be reduced from 1.30 dp to 1.25, it is thought that the weight of eyeglasses is reduced and customer satisfaction is improved.

Whitening refers to a phenomenon in which a surface or edge of a lens is hazed and seems to get humidified or foggy, and may be a kind of white turbidity. In addition, yellowing refers to a phenomenon in which color of a lens resin changes over time, and may be related to weather resistance. It is understood that whitening or white turbidity can occur when there is inappropriate combination, low affinity or poor compatibility between various monomers included in a composition. However, the inventors of the present invention found a composition free from whitening or white turbidity by performing a large number of experiments and it is understood that the composition can be sufficiently used for an optical lens since yellowing of the composition was not observed even after weather resistance testing for one year or more.

A near-infrared absorbent solution capable of being used for the lens according to the present invention is not particularly limited so long as the near-infrared absorbent solution is a solution of a pigment having maximum absorption in a near-infrared range (wavelength of 800 nm to 1200 nm). However, a phthalocyanine pigment is well known as a near-infrared absorbent, and a process, in which a threshold of absorption wavelength thereof changes due to a different molecular structure, is also well known. Thus, according to the present invention, various phthalocyanine pigments having different thresholds of absorption wavelength may be used, as needed. To increase absorption in the near-infrared range, a solution in which at least two near-infrared absorbents are mixed may be used. Examples of a commercially available phthalocyanine pigment may include Excolor IR-series, TXEX series (Nippon Shokubai Co., Ltd.), MIR-369, MIR-389 (Mitsui Co., Ltd.), PANAX (Ukseung Chemical Co., Ltd.), and the like.

The kind and amount of phthalocyanine pigment may be determined from change in a spectral transmittance curve by preliminary examples in a state that a transmittance of 10% to 20% in a visible light range is secured. For example, a spectral transmittance curve of a transparent resin, which is obtained by adding a plurality of phthalocyanine pigments having different structures in suitable amounts within a certain range based on a certain amount of a composition of monomers for polyurethane resins, may be analyzed. If the amount of the phthalocyanine pigment is low, the optical polymerizable composition has insufficient absorption capabilities in the near-infrared range, and if the amount of the phthalocyanine pigment is high, the optical polymerizable composition has insufficient transparency in the visible light range, thereby leading to deterioration in properties of the eyeglass lens.

According to the present invention, a plurality of phthalocyanine pigments is selected such that the optical polymerizable composition has high near-infrared absorption capabilities corresponding to a transmittance of less than 5% at a wavelength of 800 nm to 1,000 nm. Next, certain amounts of the pigments are added in a certain weight ratio, followed by repeatedly analyzing a spectral transmittance curve of the obtained transparent polyurethane resin, thereby determining optimum combination and amounts of the phthalocyanine pigments.

According to the present invention, through such preliminary examples, the following commercially available phthalocyanine compounds (Ukseung Chemical Co., Ltd.) may be used:

(i) PANAX FND-83 as a phthalocyanine pigment (I) having a transmittance of less than 10% as a minimum value of a spectral transmittance curve in a wavelength range of 800 nm to 850 nm;

(ii) PANAX FND-88 as a phthalocyanine pigment (II) having a transmittance of less than 10% as a minimum value of a spectral transmittance curve in a wavelength range of 875 nm to 925 nm; and (iii) PANAX FND-96 as a phthalocyanine pigment (III) having a transmittance of less than 10% as a minimum value of a spectral transmittance curve in a wavelength range of 950 nm to 1000 nm.

According to the present invention, in a preliminary example, amounts of a plurality of phthalocyanine pigments were determined by adding the phthalocyanine pigments or by increasing the amounts thereof in the range of 0.01 g to 100 g based on 100 kg of a poly(thio)urethane composition. As a result, the pigments may be present in amounts of about 10 g to 80 g based on 100 kg of the poly(thio)urethane composition.

According to the present invention, the UV absorbent, which is used to improve light resistance of a plastic eyeglass lens and to block UV light, may be any UV absorbent known in the art without limitation so long as the UV absorbent is able to be used in a resin composition for eyeglass lenses. For example, the UV absorbent may include ethyl-2-cyano-3,3-diphenylacrylate, 2-(2'-hydroxy-5-methylphenyl)-2H-benzotriazole, 2-(2'-hydroxy-3',5'-di-t-butylphenyl)-5-chloro-2H-benzotriazole, 2-(2'-hydroxy-3'-t-butyl-5'-methylphenyl)-5-chloro-2H-benzotriazole, 2-(2'-hydroxy-3',5'-di-t-amylphenyl)-2H-benzotriazole, 2-(2'-hydroxy-3',5'-di-t-butylphenyl)-2H-benzotriazole, 2-(2'-hydroxy-5'-t-butylphenyl)-2H-benzotriazole, 2-(2'-hydroxy-5'-t-octylphenyl)-2H-benzotriazole, 2,4-dihydroxybenzophenone, 2-hydroxy-4-methoxybenzophenone, 2-hydroxy-4-octyloxybenzophenone, 4-dodecyloxy-2-hydroxybenzophenone, 4-benzyloxy-2-hydroxybenzophenone, 2,2',4,4'-tetrahydroxybenzophenone, 2,2'-dihydroxy-4,4'-dimethoxybenzophenone, and the like. These UV absorbents may be used alone or in combination thereof. Preferably, the UV absorbent may include 2-(2'-hydroxy-5-methylphenyl)-2H-benzotriazole, 2-hydroxy-4-methoxybenzophenone, ethyl-2-cyano-3,3-diphenylacrylate, 2-(2'-hydroxy-5'-t-octylphenyl)-2H-benzotriazole, 2,2'-dihydroxy-4,4'-dimethoxybenzophenone, 2-(2'-hydroxy-3',5'-di-t-amylphenyl)-2H-benzotriazole, 2-(2'-hydroxy-3,5'-di-t-butylphenyl)-5-chloro-2H-benzotriazole, 2-(2'-hydroxy-3'-t-butyl-5'-methylphenyl)-5-chloro-2H-benzotriazole, and 2,2-dihydroxy-4,4'-dimethoxybenzophenone, which have good ultraviolet absorption capabilities at a wavelength of 400 nm or less and good solubility in the composition according to the present invention.

According to the present invention, in order to effectively block UV light while improving photostability, the UV absorbent is present in an amount of 0.001 wt % to 10 wt % (10 ppm to 100,000 ppm), preferably 0.1 wt % to 5 wt % (1,000 ppm to 50,000 ppm), more preferably 0.3 wt % to 2 wt % (3,000 ppm to 20,000 ppm) based on 100 kg of the poly(thio)urethane composition. If the amount of the UV absorbent is less than this range, it is difficult to effectively block harmful UV light, and if the amount of the UV absorbent is greater than this range, it is difficult to dissolve the UV absorbent in the optical lens composition and a cured optical lens can suffer from dot patterns generated on a surface thereof or exhibit deteriorated transparency.

According to the present invention, in order to uniformly prepare an absorbent including the near-infrared absorbent, a uniform absorbent solution is prepared by uniformly mixing the near-infrared absorbent with the polyisocyanate used as the liquid (I). A resin monomer used for a solution of the near-infrared absorbent is not particularly limited so long as the near-infrared absorbent can be uniformly dissolved or dispersed in the resin monomer. The resin monomer used for the solution of the near-infrared absorbent may include polyester, acrylic, polyamide, polyurethane, polyolefin, and polycarbonate resins. However, since the polyisocyanate is used as the liquid (I) in the polyurethane optical composition according to the present invention, a portion of the polyisocyanate may be used as is.

*(Other Additives of Transparent Resin Composition)

To achieve required viscosity of the composition and achieve optical properties thereof, such as transparency, index of refraction, specific gravity, impact resistance and heat resistance, which are required to obtain a resin for a lens from the composition, the composition may include various additives. According to the present invention, the additives include various materials such as photostabilizers, antioxidants, bluing agents, and the like.

In addition, to adjust reaction rate to a desired rate, a reaction catalyst may be appropriately added to the composition. The catalyst may include, for example, tin compounds such as dibutyltindilaurate, dibutyltin dichloride, dimethyltin dichloride, tetramethyldiacetoxydistannoxane, tetraethyldiacetoxydistannoxane, tetrapropyldiacetoxydistannoxane, and tetrabutyldiacetoxydistannoxane, and amine compounds such as tertiary amines, as a urethanization catalyst. These catalysts may be used alone or in combination thereof. The catalyst may be present in an amount of 0.001 wt % to 1 wt % based on the total weight of a monomer of the composition. Within this range, the composition can have good polymerizability and pot life, and the obtained resin can have good optical properties such as transparency and light resistance.

When the composition according to the present invention is cured by polymerization, various curing methods may be used depending upon application. Although the curing method is not particularly limited, thermal curing is mainly used. In this way, the resin according to the present invention is obtained. The resin according to the present invention is obtained by mold polymerization, which is a general mold injection method.

In addition, according to the present invention, the bluing agent serves to correct initial color of the lens and may include organic dyes, organic pigments, inorganic pigments, and the like. The organic dyes and the like are present in an amount of 0.1 ppm to 50,000 ppm, preferably 0.5 ppm to 10,000 ppm based on 1 g of the resin composition for optical lenses, thereby preventing the lens from yellowing due to addition of the UV absorbent and due to the optical resin, the monomer and the like.

According to the present invention, the resin composition for optical lenses may further include a release agent and a polymerization initiator, which are generally used. The release agent may be selected from among fluorine-based nonionic surfactants, silicone-based nonionic surfactants, and alkyl quaternary ammonium salts. These release agents may be used alone or in combination thereof. Preferably, the release agent includes a phosphoric acid ester. In addition, the polymerization initiator may include amine compounds, tin compounds, and the like. These polymerization initiators may be used alone or in combinations thereof.

First, the optical polymerizable composition according to the present invention is obtained by adding the polymerization initiator to the composition, which is obtained by mixing the polyisocyanate corresponding to the liquid (I) with the polythiol corresponding to the liquid (II). Next, the polymerizable composition is thermally cured, thereby obtaining the optical lens, particularly the eyeglass lens. A process of producing an eyeglass lens by thermally curing the polymerizable composition according to the present invention will be described in detail below.

It is required to be evaluated whether the optical lens produced according to the present invention has suitable properties as a plastic or near-infrared blocking eyeglass lens. As properties of the optical lens, (1) index of refraction (nD) and Abbe number ($v_d$), (2) impact resistance, (3) heat resistance (Tg), (4) specific gravity, and (5) visible and near-infrared transmittance were evaluated by the following methods.

(1) Index of refraction (nD) and Abbe number ($v_d$): Index of refraction and Abbe number were measured using an Abbe refractometer (model: 1T, ATAGO Co., Ltd.).

(2) Impact resistance: Impact resistance was measured in accordance with FDA test standards as follows. Steel balls were dropped from a height of 127 cm onto a specimen, which was a flat lens having a diameter of 80 mm and a thickness of 1.2 mm, at room temperature (20° C.) in order from light weight to heavy weight, and potential energy corresponding to a weight causing the specimen to be broken was measured, thereby evaluating impact resistance.

Steel ball weight: Whether a lens was broken was observed by performing a drop ball test using steel balls having weights of 16 g, 32 g, 65 g, 100 g, 200 g, and 300 g, thereby calculating potential energy when the specimen was broken.

Calculation Example-1

When FDA standards (16 g, 127 cm) are applied, potential energy (Ep) is calculated as follows.

$$Ep=mgh=0.016*9.8*1.27=0.2 \text{ (J)}$$

Calculation Example-2

When industrial safety standards (67 g, 127 cm) are applied $$Ep=mgh=0.067*9.8*1.27=0.83 \text{ (J)}$$

(2) Heat resistance: Glass transition temperature (Tg) of a specimen was measured using a thermal analyzer (DSC N-650, SCINCO Co., Ltd.), thereby evaluating heat resistance.

(4) Specific gravity: Specific gravity was measured by Archimedes' method.

(5) Whether to block near-infrared light or not and Transmittance: An absorption spectrum of a specimen, which was a flat lens having a thickness of 1.2 mm, was measured using a UV/Vis-NIR spectrophotometer (UV-3600, SHIMADZU Co., Ltd.), thereby directly measuring transmittance (T %) in a visible light range (400 nm to 800 nm) from the absorption spectrum.

Hereinafter, the present invention will be described in more detail with reference to preliminary examples and examples.

To find an optimum amount of each of components in consideration of heat resistance and impact strength of a lens, the inventors of the present invention performed preliminary examples according to a method of producing an optical lens described below. First, to find an optimum amount of each of isophorone diisocyanate (IPDI) and 1,6-hexamethylene diisocyanate (HDI), Preliminary Example 1 (Biuret/HDI/GST system, weight ratio of Biuret to HDI), Preliminary Example 2 (HDI/IPDI/GST system, weight ratio of HDI to IPDI), Preliminary Example 3 (Biuret/IPDI/GST system, weight ratio of Biuret to IPDI), and Preliminary Example 4 (use of various isocyanates, the kind of isocyanate) were performed. As used herein, the term "Biuret" is defined as an abbreviated term for the isocyanate compound represented by Formula 1.

(Typical Method of Producing Optical Lens)

Biuret (Tolonate HDB LV, Perstep Co., Ltd.), HDI and IPDI were mixed and dissolved in various composition ratios (mole ratio of NCO/SH=1.0), followed by adding 630 ppm of dibutyltin chloride as a curing catalyst, 15,000 ppm of SEESORB 709 (Shipro Co., Ltd., Japan) corresponding to a UV absorbent, and 1,200 ppm of Zelec UN (Dupont Co., Ltd.) as an internal mold release agent to the mixture. Next, the components were subjected to vacuum stirring at room temperature for 40 minutes, thereby completely removing bubbles. After dissolution, PEMP and GST, which are polythiols, were mixed with the resultant, followed by degassing the mixture for 40 minutes. Next, the mixture was injected into a glass mold assembled by an adhesive tape.

Next, the glass mold, into which the mixture was injected, was loaded into a forced convection oven. The mixture was polymerized by performing the following processes in the oven, followed by cooling the mixture: Heating from room temperature to 35° C. for 4 hours, heating from 35° C. to 50° C. for 5 hours, heating from 50° C. to 75° C. for 4.5 hours, heating from 75° C. to 90° C. for 5 hours, maintaining at 90° C. for 3 hours, heating from 90° C. to 130° C. for 2 hours, maintaining at 130° C. for 1.5 hours, and cooling from 130° C. to 70° C. for 1 hour. After completion of polymerization, the mixture was separated from the mold, thereby obtaining a urethane optical lens. The obtained lens was annealed at 120° C. for 1 hour 40 minutes. After annealing, a cured raw lens was released from a glass mold, thereby obtaining an optical lens having a central thickness of 1.2 mm.

The obtained optical lens was processed to a diameter of 80 mm, followed by ultrasonic-cleaning the optical lens with an aqueous alkaline cleaning solution, and then annealed at 120° C. for 2 hours. Next, the raw lens is coated by dipping into a silicone hard coating liquid and then thermally dried. Next, silicon oxide, zirconium oxide, silicon oxide, ITO, zirconium oxide, silicon oxide and zirconium oxide were vacuum-deposited onto both surfaces of the lens in the stated order, thereby obtaining a hard-coated and multi-coated optical lens.

Finally, the obtained optical lens was measured as to properties such as index of refraction, Abbe number, Tg, impact resistant energy, and specific gravity, and suitable components and composition ratios were confirmed through the measured values.

(1) Preliminary Example 1

In a Biuret/HDI/GST system, regardless of weight ratios of Biuret to HDI, the lens had excellent impact resistance and poor heat resistance. In particular, as the amount of HDI increased, the lens had poorer heat resistance and suffered from severe whitening and yellowing. In addition, the lens had a high index of refraction of 1.58 to 1.61 and an Abbe number of 37 to 41. Therefore, IPDI was added to improve heat resistance, and the next Preliminary Example 2 was performed.

(2) Preliminary Example 2

In an HDI/IPDI/GST system, the lens had excellent impact resistance and poor heat resistance when HDI was present in an amount of 50% or more, and the lens had poor impact resistance and excellent heat resistance when IPDI was present in an amount of 50% or more. Since the lens suffered from whitening and yellowing regardless of weight ratios of HDI to IPDI, the lens had significantly deteriorated properties as a lens. Therefore, Biuret was added to supplement heat resistance and impact resistance and to improve whitening and yellowing, and the next Preliminary Example 3 was performed.

(3) Preliminary Example 3

In a Biuret/IPDI/GST system, despite poor impact resistance except when Biuret was present in an amount of 100%, the lens had excellent heat resistance due to an effect of IPDI and exhibited substantial improvement in whitening and yellowing.

(4) Preliminary Example 4

To further improve impact resistance, index of refraction, Abbe number, whitening and yellowing based on the results of Preliminary Examples 1 to 3, various isocyanates were used by taking a Biuret/HDI/IPDI system as a basis. Preliminary Example 4 was performed to find optimum proportions of the components while changing the proportions thereof.

In addition, as a result of comparing impact resistance by changing the kind of isocyanate, although each of NBDI, TCDI and H12MDI had poor impact resistance by itself, TCDI combined with Biuret and HDI exhibited good impact resistance. In addition, it is thought that Biuret and HDI need to be mixed into the composition in order to maintain impact resistance of the lens, and that IPDI, H12NDI or TCDI can be used to reinforce heat resistance of the lens.

Examples of the present invention were specifically performed based on Preliminary Examples 1 to 4. In Examples 1 and 2, properties of the lens were checked depending upon proportions of Biuret, IPDI and H12MDI. In Example 1, the amount of HDI was fixed to 25 wt % and the amount of GST was changed. In Example 2, the amount of HDI was slightly increased. Example 3 was performed while changing weight of HDI and Example 4 was performed while changing the kind of polythiol corresponding to the liquid (II).

The inventors of the present invention performed many examples in order to find the appropriate component (d), based on the proportions between the suitable components (a), (b) and (c), which were found through the preliminary examples as set forth above. Through these examples, the polyurethane composition having excellent impact resistance and other properties was finally prepared, thereby completing the present invention.

Example 1

In each example, an optical lens was prepared by a typical method using components and amounts thereof for each composition as listed in Table 1.

(Table 1) Results Depending Upon Weight Ratios Between Biuret, IPDI and H12MDI (HDI: 25 wt % Fixed, GST)

TABLE 1

|  |  | Example | | | | | |
| --- | --- | --- | --- | --- | --- | --- | --- |
|  |  | (1-1) | (1-2) | (1-3) | (1-4) | (1-5) | (1-6) |
| Monomer composition (g) | HDI Biuret | 0 | 25 | 37.5 | 37.5 | 50 | 62 |
|  | HDI | 25 | 25 | 25 | 25 | 25 | 25 |
|  | IPDI | 75 | 50 | 25 | 37.5 | 25 | 13 |
|  | H12MDI |  |  | 37.5 |  |  |  |
|  | GST | 84.42 | 77.03 | 68.87 | 73.34 | 69.65 | 66.10 |
| Lens properties | Impact resistance E (J) | 0.35 | 2.52 | 3.52 | 5.63 | 5.06 | 4.47 |
|  | Tg (° C.) | 95 | 88 | 78 | 87 | 80 | 75 |
|  | Index of refraction (liquid) | 1.5391 | 1.5384 | 1.5395 | 1.5383 | 1.5381 | 1.5381 |
|  | Index of refraction (solid) | 1.6012 | 1.5995 | 1.5975 | 1.5979 | 1.5970 | 1.5972 |
|  | Abbe number ($\nu_d$) | 38 | 39.4 | 39.6 | 39.6 | 40.1 | 40.2 |
|  | Whitening | Slight | Severe | No | No | No | No |
|  | Yellowing (After second curing) | No | No | Almost No | No | No | No |
|  | Specific gravity | 1.25 | 1.25 | 1.24 | 1.25 | 1.23 | 1.23 |

To summarize the results of Preliminary Examples 1 to 4, yellowing resistance of the lens was, in increasing order, Biuret>IPDI>>HDI, and it was understood that, if HDI needed to be used to maintain impact resistance of the lens, the lens would maintain yellowing resistance when HDI was present in an amount of about 25 wt %.

Regarding the degree of whitening (white turbidity) of the lens, although whitening was not observed in Biuret, HDI suffered from significantly severe whitening. It was supposed that this was related to viscosity of the composition, an adhesive of the tape, and solubility of the composition.

As a result of performing examples depending upon composition ratios while the amount of HDI in the isocyanate composition was fixed to 25 wt %, the lens according to the composition ratio of Example (1-4) exhibited the highest impact resistance and suitable heat resistance corresponding to Tg of 87° C., and had a specific gravity of 1.23 to 1.25, and thus was lighter than a typical commercialized high refractivity lens (nD=1.60) having a specific gravity of 1.30.

Example 2

Examples were performed depending upon composition ratios when the amount of HDI was increased to 29 wt %. Here, in each example, an optical lens was prepared by atypical method using components and amounts thereof for each composition as listed in Table 2.

(Table 2) Results Depending Upon Ratios Between Amounts of Biuret and IPDI (HDI: 29 wt % Fixed, GST)

TABLE 2

|  |  | Example | | |
|---|---|---|---|---|
|  |  | (2-1) | (2-2) | (2-3) |
| Monomer composition (g) | HDI Biuret (g) | 24 | 35.5 | 47 |
|  | HDI (g) | 29 | 29 | 29 |
|  | IPDI (g) | 47 | 35.5 | 24 |
|  | GST (g) | 78.34 | 73.34 | 71.54 |
| Lens properties | Impact resistance E (J) | 3.92 | 6.30 | 6.70 |
|  | Tg (° C.) | 87 | 83 | 78 |
|  | Index of refraction (liquid) | 1.5380 | 1.5380 | 1.5377 |
|  | Index of refraction (solid) | 1.5995 | 1.5988 | 1.5980 |
|  | Abbe number ($v_d$) | 39.1 | 38.3 | 42.8 |
|  | Whitening | No | No | No |
|  | Yellowing (After second annealing) | No | No | No |
|  | Specific gravity | 1.24 | 1.23 | 1.23 |

To summarize the results of Examples 1 and 2, when the amount of HDI was either 25 wt % or 29 wt %, although the lens suffered from almost no yellowing after second annealing, the lens was slightly clearer and more transparent when the amount of HDI was 25 wt % than when the amount of HDI was 29 wt %. Although the use of 29 wt % of HDI was more advantageous than the use of 25 wt % of HDI in terms of impact resistance, the use of 25 wt % of HDI was more advantageous than the use of 29 wt % of HDI in terms of heat resistance. Therefore, the lens including 25 wt % of HDI, which provided good heat resistance, exhibited heat resistance corresponding to Tg of 87° C., suffered from significantly reduced multilayer cracking, and was relatively light with a specific gravity of 1.23 to 1.24.

Example 3

To further improve heat resistance of the lens, examples were performed as follows while the amount of HDI was further reduced. In each example, an optical lens was prepared by a typical method using components and amounts thereof for each composition as listed in Table 3.

(Table 3) Results of Lens Properties Depending Upon Amount of HDI (Biuret:IPDI=1:1, GST)

TABLE 3

|  |  | Example | | |
|---|---|---|---|---|
|  |  | (3-1) | (3-2) | (3-3) |
| Monomer composition (g) | HDI Biuret (g) | 40 | 37.5 | 35.5 |
|  | HDI (g) | 20 | 25 | 29 |
|  | IPDI (g) | 40 | 37.5 | 35.5 |
|  | GST (g) | 71.35 | 73.34 | 74.94 |
| Lens properties | Impact resistance E (J) | 2.53 | 5.63 | 6.30 |
|  | Tg (° C.) | 87 | 87 | 83 |
|  | Index of refraction (liquid) | 1.5389 | 1.5383 | 1.5380 |
|  | Index of refraction (solid) | 1.5972 | 1.5979 | 1.5988 |
|  | Abbe number ($v_d$) | 40.0 | 39.6 | 39.3 |
|  | Whitening | No | No | No |
|  | Yellowing (After second annealing) | No Change | No Change | No Change |
|  | Specific gravity | 1.24 | 1.25 | 1.25 |

Impact strength of the lens including 20 wt % of HDI was half or less that of the lens including 25 wt % of HDI and had Tg maintained at 87° C. without improvement in Tg. Therefore, it was though that optimum amounts of Biuret, HDI and IPDI in the Biuret/HDI/IPDI system were 37.5 wt %, 25 wt %, and 37.5 wt %, respectively. As a result, the lens according to the present invention achieved excellent results in terms of whitening, index of refraction (1.60), yellowing and the like, and was relatively light since the lens had a specific gravity of 1.24 to 1.25.

Example 4

When the composition ratio of the isocyanate composition was optimized through Examples 1 to 3, Example 4 was performed in order to see results depending upon change in the polythiol and change in the kind thereof. Results are shown in Table 4.

37.5 g of HDI Biuret (Tolonate HDB LV, Perstep Co., Ltd.), 25 g of HDI and 37.5 g of IPDI were mixed and dissolved, followed by adding 630 ppm of dibutyltin chloride as a curing catalyst, 15,000 ppm of SEESORB 709 (Shipro Co., Ltd., Japan) corresponding to a UV absorbent, and 1,200 ppm of Zelec UN (Dupont Co., Ltd.) as an internal mold release agent to the mixture. Next, the components were subjected to vacuum stirring at room temperature for 40 minutes, thereby completely removing bubbles. After dissolution, 12.84 g of PEMP and 64.21 g of GST were mixed with the resultant, followed by degassing the mixture for 40 minutes. Next, the mixture was injected into a glass mold assembled by an adhesive tape. The next processes were performed according to the typical method of producing an optical lens.

The finally obtained optical lens had an index of refraction (nD/20° C.) of 1.5932, an Abbe number of 39.7, Tg of 87° C. and an impact resistance energy of 6.23 J (300 g, 220 cm breaking=500 g, 127 cm breaking), and other results are shown in Table 4.

(Table 4) Results Depending Upon Proportion of Liquid (II) (Biuret: 37.5%, HDI: 25%, IPDI: 37.5%, all Fixed)

TABLE 4

|  |  | Example | | | | | |
|---|---|---|---|---|---|---|---|
|  |  | (4-1) | (4-2) | (4-3) | (4-4) | (4-5) | (4-6) |
| Liquid (I) | BIURET | 37.5 | 37.5 | 37.5 | 37.5 | 37.5 | 37.5 |
|  | HDI | 25 | 25 | 25 | 25 | 25 | 25 |
|  | IPDI | 37.5 | 37.5 | 37.5 | 37.5 | 37.5 | 37.5 |
| Liquid (II) | PEMP | 0 (0%) | 12.84 (16.7%) | 19.76 (25%) | 42.86 (50%) | 70.23 (75%) | 103.16 (100%) |
|  | GST | 73.34 (100%) | 64.21 (83.3%) | 59.29 (75%) | 42.86 (50%) | 23.41 (25%) | 0 (0%) |
| Lens properties | Impact resistance E (J) | 5.63 | 6.23 | 3.77 | 3.57 | 3.78 | 5.34 |
|  | Tg (° C.) | 87 | 87 | 88 | 86 | 85 | 83 |
|  | Index of refraction (liquid) | 1.5383 | 1.5339 | 1.5319 | 1.5246 | 1.5169 | 1.5069 |
|  | Index of refraction (solid) | 1.5979 | 1.6004 | 1.5899 | 1.5770 | 1.5645 | 1.5529 |
|  | Abbe number ($v_d$) | 39.6 | 41.0 | 41.2 | 42.4 | 43.8 | 45.2 |
|  | Whitening | No | No | No | No | No | No |
|  | Yellowing (After second curing) | No | No | No | No | No | No |
|  | Specific gravity | 1.24 | 1.25 | 1.24 | 1.24 | 1.22 | 1.20 |

The lens had slightly deteriorated impact resistance when the amount of PEMP was about 25% of Example (4-3) or more, and had maximum impact resistance (6.23 J) when the amount of PEMP was about 16% of Example (4-2). Thus, it was thought that the lens exhibited good impact resistance when PEMP was present in an amount of 10% to 20% (wt %) in the polythiol.

In the Biuret/HDI/IPDI system, Biuret, HDI, IPDI, GST and PEMP were present in optimum amounts of 37.5 wt %, 25 wt %, 37.5 wt %, 83.3 wt % and 16.7 wt % in the lens of Example (4-2), respectively. Under this condition, since the lens had optimum impact resistance, a high index of refraction (nD) of 1.6004, an Abbe number of 41 and a specific gravity of 1.25 and suffered from neither whitening nor yellowing, the lens exhibited excellent properties as an eyeglass lens.

Example 5

Since properties of the lens of Example 4-2 were in a desirable range, in order to confirm a critical value of a content ratio of PEMP/GST used as the component (d) of the liquid (II) included in the optical resin composition, Example (5-1), in which the content ratio of PEMP/GST was 10/90, and Example (5-2), in which the content ratio of PEMP/GST was 20/80 were additionally performed. Properties of the lenses of Examples (5-1) and (5-2) are shown in Table 5 together with properties of the lens of Example (4-2).

(Table 5) Results for Confirming Critical Value of Content Ratio of PEMP/GST

TABLE 5

|  |  | Change in mixing ratio of liquids (I) and (II) and in H12MDI/TCDI | | | | |
|---|---|---|---|---|---|---|
|  |  | (5-1) (PEMP/GST = 10/90) | (4-2) (PEMP/GST = 16.7/83.3) | (5-2) (PEMP/GST = 20/80) | (5-3) (H12MDI) | (5-4) (TCDI) |
| Liquid (I) (g) | HDI BIURET | 37.5 | 37.5 | 37.5 | 37.5 | 31.12 |
|  | HDI | 25 | 25 | 25 | 25 | 28.68 |
|  | IPDI | 37.5 | 37.5 | 37.5 |  |  |
|  | H12MDI |  |  |  | 37.5 |  |
|  | TCDI |  |  |  |  | 40.21 |
| Liquid (II) (g) | PEMP | 7.55 (10%) | 12.84 (16.7%) | 15.57 (20%) | 68.87 | 69.12 |
|  | GST | 67.98 (90%) | 64.21 (83.3%) | 62.28 (80%) |  |  |
| Lens properties | Impact resistance E (J) | 6.6 (J) | 6.23 (J) | 5.2 (J) | 3.52 (J) | 4.78 (J) |
|  | Tg (° C) | 91 | 91 | 89.4 | 85.2 | 86 |
|  | Index of refraction (liquid) | 1.5332 | 1.5331 | 1.5327 | 1.5395 | 1.5471 |
|  | Index of refraction (solid) | 1.5955 | 1.5932 | 1.5930 | 1.5975 | 1.6028 |
|  | Abbe number ($v_d$) | 37.82 | 39.76 | 39.96 | 39.6 | 39.3 |
|  | Whitening | No | No | No | No | No |
|  | Yellowing (After second curing) | No | No | No | No | No |
|  | Specific gravity | 1.24 | 1.24 | 1.25 | 1.24 | 1.24 |

As can be seen from Table 5, the lens of Example (5-1) had slightly increased impact resistance, and the lens of Example (5-2) had slightly reduced impact resistance, as compared with the lens of Example (4-2). However, it was confirmed that the lenses of Examples (5-1) and (5-2) exhibited satisfactory properties in terms of glass transition temperature, index of refraction, Abbe number, specific gravity, whitening, and yellowing.

In Examples (5-3) and (5-4), H12MDI and TCDI corresponding to alicyclic isocyanates capable of exhibiting heat resistance were used instead of IPDI corresponding to an isocyanate, and the lenses of Examples (5-3) and (5-4) exhibited satisfactory properties in terms of impact resistance, heat resistance, specific gravity, index of refraction, whitening, and yellowing.

Example 6

In this example, as the component (d) of the liquid (II), GST, PEMP, GMT or DMDDU was used instead of the mixture of GST/PEMP. Monomers were mixed in amounts as listed in Table 6 and then cured, thereby measuring properties of the lens.

37.5 g of biuret (Tolonate HDB LV, Perstep Co., Ltd.), 25 g of HDI and 37.5 g of IPDI were mixed and dissolved, followed by adding 630 ppm of dibutyltin chloride as a curing catalyst, 15,000 ppm of SEESORB 709 (Shipro Co., Ltd., Japan) corresponding to a UV absorbent, and 1,200 ppm of Zelec UN (Dupont Co., Ltd.) as an internal mold release agent to the mixture. Next, the components were subjected to vacuum stirring at room temperature for 40 minutes, thereby completely removing bubbles. After dissolution, the compound of polythiol as listed in Table 6 was mixed with the resultant, followed by degassing the mixture for 40 minutes. Next, the mixture was injected into a glass mold assembled by an adhesive tape.

A uniform solution obtained from the composition prepared above was subjected again to vacuum stirring for 40 minutes, and then injected into a mold fixed to the glass mold by adhesive tape.

The glass mold, into which the mixture solution was injected, was introduced into a forced convection oven, and then subjected to heating from room temperature (20° C.) to 35° C. for 5 hours, heating to 50° C. for 7 hours, heating to 90° C. for 7 hours, heating to 130° C. for 4 hours, maintaining at 130° C. for 2 hours, and cooling to 80° C. for 1 hour, thereby performing first molding. After completion of polymerization, the mold was unloaded from the oven, followed by releasing the lens from the mold, thereby obtaining the optical lens having a central thickness of 1.2 mm and a diameter of 80 mm. The obtained lens was further annealed at 130° C. for 1 hour.

The obtained raw lens was subjected to hard coating by dipping the raw lens into a hard coating liquid, followed by thermally curing the lens, and then subjected to vacuum deposition, thereby obtaining the hard-coated and multi-coated optical lens. Properties of the obtained lens are shown in Table 6.

(Table 6) Results Depending Upon Kinds of Polythiols (Biuret: 37.5%, HDI: 25%, IPDI: 37.5%, all Fixed) (as a Polythiol, SET: (6-3), MET: (6-7))

TABLE 6

| | | Example | | | | | | |
|---|---|---|---|---|---|---|---|---|
| | | (6-1) | (6-2) | (6-3) | (6-4) | (6-5) | (6-6) | (6-7) |
| Liquid (I) (g) | HDI BIURET | 37.5 | 37.5 | 37.5 | 37.5 | 37.5 | 37.5 | 37.5 |
| | HDI | 25 | 25 | 25 | 25 | 25 | 25 | 25 |
| | IPDI | 37.5 | 37.5 | 37.5 | 37.5 | 37.5 | 37.5 | 37.5 |
| Liquid (II) (g) | GST | 73.34 | | | | | 31.89 | |
| | MET | | | | | | | 73.34 |
| | SET | | | 100.4 | | | | |
| | PEMP | | | | 103.2 | | | |
| | GMT | | 56.42 | | | | 31.89 | |
| | DMDDU | | | | | 77.59 | | |
| Lens properties | Impact resistance E (J) | 5.63 | 2.52 | 5.94 | 5.34 | 2.94 | 3.78 | 5.88 |
| | Tg (° C.) | 87 | 99 | 83 | 83 | 95 | 94 | 87 |
| | Index of refraction (liquid) | 1.5383 | 1.5290 | 1.5314 | 1.5069 | 1.5461 | 1.5332 | 1.5379 |
| | Index of refraction (solid) | 1.5979 | 1.5909 | 1.5931 | 1.5529 | 1.6009 | 1.5948 | 1.5974 |
| | Abbe number ($v_d$) | 39.6 | 40.6 | 39.8 | 45 | 40.5 | 42.5 | 40.2 |
| | Whitening | No | Occur | No | No | No | Occur | No |
| | Yellowing (After second curing) | No | Occur | No | No | Occur | Occur | No |
| | Specific gravity | 1.24 | 1.24 | 1.25 | 1.20 | 1.25 | 1.24 | 1.23 |

MET: 1,3-bis(2-mercaptoethylthio)propane-2-thiol
SET: (3,6,10,13-tetrathiapentadecane-1,8,15-trithiol)
GMT: 2-(2-mercaptoethylthio)propane-1,3-dithiol
DMDDU: 4,8-dimercaptomethyl-1,11-dimercapto-3,6,9-trithiaundecane Since it was thought that the ratio of Biuret/HDI/IPDI would be useful for an impact resistant lens in an optimized isocyanate system, Example 6 was performed to investigate applicability of other polythiols. As shown in Table 6, even though other polythiols such as GST, MET, SET, PEMP, GMT, DMDDU, or mixtures of GST and GMT were used, the lens had sufficient impact resistance. In addition, since the lens of Example 6 had a good Abbe number of 39 to 45, was lightweight due to the specific gravity thereof of 1.24 to 1.25, and was not observed to suffer from yellowing or whitening, it was thought that the lens of Example 6 could be used as an eyeglass lens. GMT and DMDDU allowed the lens to have higher heat resistance by 10° C. or more than other polythiols. Thus, it was understood that Biret/HDI/IPDI corresponding to an isocyanate composition applicable to various polythiols was a combination of compounds, which was useful for polyurethanes.

Comparative Examples 1 to 4

After the optical lenses according to the present invention were prepared, properties thereof were compared with those of other companies. Properties of the other companies are shown in Table 7. The lens of Comparative Example 1 corresponding to a typical high refractive 1.60 lens (Mitsui Co., Ltd.) was obtained by mixing the same components in the same amounts as in a typical lens and curing the mixture, with reference to Comparative Example 1 of Korean Patent No. 10-0973858, followed by measuring properties of the lens. In addition, the lens of Comparative Example 2 corresponding to an ultrahigh refractivity lens having an index of refraction of 1.67 was obtained with reference to Korean Patent No. 1992-005708 (Mitsui Co., Ltd.); the lens of Comparative Example 3 corresponding to a medium refractivity lens having an index of refraction of 1.55 to 1.56 was obtained with reference to Korean Patent No. 10-0689867; and the lens of Comparative Example 4 corresponding to a high refractivity lens and was obtained using a polyurethane according to Korean Patent Publication No. 10-2008-0000615 (Mitsui Co., Ltd.). Data on properties of these lenses are shown in Table 7 for comparison.

(Table 7) Comparison with Properties of Lenses of Other Companies

Example 4 obtained by realizing Korean Patent Publication No. 10-2008-0000615 was hazy and observed to suffer from white turbidity and was not easily released from a lens mold. Further, the lens of Comparative Example 4 had an impact resistance energy of 0.8 J, which is significantly different from those of the lenses of Examples 1 to 5, and had a specific gravity of 1.3, which is significantly different from 1.24 to 1.25 corresponding to the specific gravity of the lens according to the present invention. Therefore, it was understood that the isocyanate composition system according to the present invention can play an outstanding role as a core raw material of an impact resistant lens.

Example 7 (High Refractive (nD=1.60), Impact Resistant PU Lens: NIR 300 ppm)

21.18 g of HDI Biuret, 14.12 g of HDI and 21.18 g of IPDI were mixed and stirred, followed by introducing 0.03 g (300 ppm) of a near-infrared absorbent (0.012 g of

TABLE 7

| | | Comparative Example 1 (Mitsui 1.60) | Comparative Example 2 (Mitsui 1.67) | Comparative Example 3 (KOC 1.56) | Comparative Example 4 (Mitsui 1.60) |
|---|---|---|---|---|---|
| Monomer Composition (g) | HDI (g) | | | 53.2 | |
| | IPDI (g) | | | 46.8 | |
| | MXDI (g) | | 100 | | |
| | NBDI (g) | 100 | | | 83 |
| | 2-ME (g) | | | | 19.6 |
| | PEMP (g) | 47.23 | | 128.6 | |
| | GST (g) | 50.20 | 92.3 | | 45.4 |
| Lens properties | Impact resistance E (J) | 0.8 | 0.3 or less | 1.4 | 0.8 |
| | Tg (° C.) | 118 | 84 | 70 | 110 |
| | Index of refraction (liquid) | 1.5398 | 1.5865 | 1.5074 | 1.5391 |
| | Index of refraction (solid) | 1.5942 | 1.6572 | 1.5562 | 1.5969 |
| | Abbe number ($v_d$) | 41 | 32 | 43 | 41 |
| | Whitening | No | No | No | Occur (White turbidity) |
| | Yellowing (Second annealing) | No | Yes | No | No |
| | Specific gravity | 1.30 | 1.35 | 1.28 | 1.31 |

* 2-ME: 2-mercaptoethanol

As shown in Table 7, the lens of Comparative Example 1 having an index of refraction of 1.60 had a significant difference in impact resistance from the lenses of Examples 1 to 5 despite suitable heat resistance and Abbe number, and thus was not suitable for use for industrial safety or sports goggle lenses. Despite a high index of refraction of 1.657, the lens of Comparative Example 2 failed to meet basic impact resistance criteria of FDA due to a low Abbe number of 32 and an impact resistance energy of 0.3 J and thus required treatment such as separate primer coating for safety, followed by hard/multi-coating when used as a general lens.

Although the lens of Comparative Example 3 prepared with reference to Korean Patent No. 10-0689867 had a medium index of refraction of 1.556 and an impact resistance energy of 1.4 J, exceeding FDA criteria of 0.3 J, it was difficult to use the lens of Comparative Example 3 for industrial safety or special impact resistant lenses. The lens of Comparative Example 3 had low heat resistance corresponding to Tg of 70° C. and specific gravity corresponding to relatively heavy weight, and in particular, had a great difference in impact resistance energy from the lens according to the present invention.

In addition, despite having similar index of refraction and Abbe number to a 1.60 lens, the lens of Comparative PANAX FND-83, 0.006 g of PANAX FND-88, 0.012 g of PANAX FND-96) to the mixture, and then stirred under a pressure of 10 torr or less for 40 minutes, thereby obtaining 56.48 g of a mixture of a polyisocyanate corresponding to a liquid (I) and the near-infrared absorbent. Next, 7.27 g of PEMP and 36.26 g of GST, which are polythiol compounds, were mixed and stirred under a pressure of 10 torr or less for 40 minutes, thereby obtaining a polythiol corresponding to a liquid (II). Next, the obtained liquid (II) was mixed with 56.48 g of the mixture of the liquid (I) and mixed with 0.12 g (1,200 ppm) of a release agent (phosphoric acid ester commercially available as ZELEC UN from DuPont Co., Ltd.) and 1.5 g (15000 ppm) of a UV absorbent (2-(2'-hydroxy-5'-t-octylphenyl)benzothiazole commercially available as UV-329), followed by stirring under a pressure of 10 torr or less for about 40 minutes.

Finally, the mixture was mixed with 0.063 g (630 ppm) of a catalyst (dibutyltin chloride) and stirred under a pressure of 10 torr or less for about 20 minutes, thereby finally obtaining an optical resin composition. The obtained composition was injected into an adhesive-taped glass mold, followed by curing in an oven pre-programmed (to be heated from room temperature to 35° C. for 4 hours, heated from 35° C. to 50° C. for 5 hours, heated from 50° C. to 75° C.

for 4.5 hours, heated from 75° C. to 90° C. for 5 hours, maintained at 90° C. for 3 hours, heated from 90° C. to 130° C. for 2 hours, maintained at 130° C. for 1.5 hours, and cooled from 130° C. to 70° C. for 1 hour), and then released from the glass mold, thereby obtaining a lens. UV-Vis-NIR analysis results of the obtained near-infrared blocking lens are shown in FIG. 2.

Example 8 (High Refractive (nD=1.60), Impact Resistant PU Lens: NIR 700 ppm)

A process was performed in the same manner as in Example 7 except that 0.07 g (700 ppm) of the near-infrared absorbent (0.028 g of PANAX FND-83, 0.014 g of PANAX FND-88, 0.028 g of PANAX FND-96) was used instead of the amount of thereof in Example 7. UV-Vis-NIR analysis results of the obtained near-infrared blocking lens are shown in FIG. 3.

Example 9 (High Refractive (nD=1.60), Impact Resistant PU Lens: NIR 1000 ppm)

A process was performed in the same manner as in Example 7 except that 0.1 g (1000 ppm) of the near-infrared absorbent (0.04 g of PANAX FND-83, 0.02 g of PANAX FND-88, 0.04 g of PANAX FND-96) was used instead of the amount of thereof used in Example 7. UV-Vis-NIR analysis results of the obtained near-infrared blocking lens are shown in FIG. 4.

Table 8 shows summarized results of lens properties, such as impact resistance energy (E), Tg, index of refraction, Abbe number, and transmittance, which were measured on each of the lenses according to the monomer compositions of Examples 7 to 9 by the measurement methods set forth above.

TABLE 8

|  |  | Example 7 | Example 8 | Example 9 |
| --- | --- | --- | --- | --- |
| Monomer Composition (g) | HDI Biuret (g) | 21.18 g | 21.18 g | 21.18 g |
|  | HDI (g) | 14.12 g | 14.12 g | 14.12 g |
|  | IPDI (g) | 21.18 g | 21.18 g | 21.18 g |
|  | PEMP (g) | 7.27 g | 7.27 g | 7.27 g |
|  | GST (g) | 36.26 g | 36.26 g | 36.26 g |
|  | Near-infrared absorbent (g) | 0.03 g (300 ppm) | 0.07 g (700 ppm) | 0.1 g (1000 ppm) |
| Lens properties | Impact resistance E (J) | 5.5 J | 5.5 J | 5.5 J |
|  | Tg (° C.) | 89.79° C. | 90.8° C. | 90.2° C. |
|  | Index of refraction (nD) | 1.5928 | 1.5926 | 1.5932 |
|  | Abbe number ($v_d$) | 42.6 | 40 | 41 |
|  | Appearance | Black Transparent | Dark black Transparent | Dark black Transparent |
|  | Transmittance (T %) (520 nm) | 50.4% (520 nm) | 43.7% (520 nm) | 35.7% (520 nm) |

As can be seen from Table 8 and FIGS. 2 to 4, when the lens included all of the high-impact resistance and high refractive (nD=1.6) poly(thio)urethane composition, the UV absorbent and the near-infrared absorbent, the lens blocked UV light having a wavelength of 400 nm or less and efficiently blocked near-infrared light having a wavelength of 800 nm to 1000 nm. In addition, it was understood that the lens could be sufficiently used as sunglasses since the lens had a relatively high transmittance of 35.7% to 50.5% (at 520 nm) in a visible light range (400 nm to 800 nm), and that the lens would be advantageously used as outdoor and sports sunglasses particularly due to high impact resistance thereof.

Example 10 (Medium Refractive (nD=1.56), Impact Resistant PU Lens: NIR 700 ppm)

In this example, the same components and process as in Example 7 were applied except for the following components and processes. The release agent, the UV absorbent, the organic dye and the catalyst, which were used in Example 7, were unchanged.

18.45 g of HDI Biuret, 12.3 g of HDI and 18.45 g of IPDI were mixed and stirred, followed by introducing 0.07 g (700 ppm) of the near-infrared absorbent (0.028 g of PANAX FND-83, 0.014 g of PANAX FND-88, 0.028 g of PANAX FND-96) to the mixture, and then stirred under a pressure of 10 torr or less for 40 minutes, thereby obtaining 49.21 g of a mixture of a liquid (I). 49.21 g of the obtained liquid (I) was mixed with 50.78 g of PEMP, 0.12 g (1200 ppm) of the release agent and 1.5 g (15000 ppm) of the UV absorbent and stirred under a pressure of 10 torr or less for about 40 minutes. Finally, the mixture was mixed with 0.063 g (630 ppm) of the catalyst and stirred under a pressure of 10 torr or less for about 20 minutes. A process subsequent to stirring was the same as in Example 7. UV-Vis-NIR analysis results of an obtained near-infrared blocking lens are shown in FIG. 5.

Example 11

MET was used instead of GST, which was a polythiol compound used in Example 7, and 0.07 g (700 ppm) of the near-infrared absorbent (0.028 g of PANAX FND-83, 0.014 g of PANAX FND-88, 0.028 g of PANAX FND-96) was used instead of the amount of thereof used in Example 7. The same components and process as in Example 7 were applied, except as set forth above, thereby obtaining a final lens. UV analysis results of the obtained near-infrared blocking lens are shown in FIG. 6.

Example 12

In this example, the same components and processes as in Example 7 were applied except the following components and processes. The release agent, the UV absorbent, the organic dye and the catalyst, which were used in Example 7, were unchanged.

18.16 g of HDI Biuret, 12.1 g of HDI and 18.16 g of IPDI were mixed and stirred, followed by introducing 0.07 g (700 ppm) of a near-infrared absorbent (0.028 g of PANAX FND-83, 0.014 g of PANAX FND-88, 0.028 g of PANAX FND-96) to the mixture, and then stirred under a pressure of 10 torr or less for 40 minutes, thereby obtaining 48.42 g of a mixture of a liquid (I). 48.42 g of the obtained liquid (I) was mixed with 8.62 g of PEMP, 42.96 g of SET, 0.12 g (1200 ppm) of the release agent and 1.5 g (15000 ppm) of the UV absorbent and stirred under a pressure of 10 torr or less for about 40 minutes. Finally, the mixture was mixed with 0.063 g (630 ppm) of the catalyst and stirred under a pressure of 10 torr or less for about 20 minutes. Processes subsequent to this stirring were the same as in Example 7. UV analysis results of an obtained near-infrared blocking lens are shown in FIG. 7.

Table 9 shows summarized results of lens properties, such as impact resistance energy (E), Tg, index of refraction, Abbe number, and transmittance, which were measured on each of the lenses according to the monomer compositions of Examples 10 to 12 by the measurement methods set forth above.

TABLE 9

|  |  | Example 10 | Example 11 | Example 12 |
|---|---|---|---|---|
| Monomer Composition (g) | HDI Biuret (g) | 18.45 g | 21.18 g | 18.18 g |
|  | HDI (g) | 12.3 g | 14.12 g | 12.1 g |
|  | IPDI (g) | 18.45 g | 21.18 g | 18.18 g |
|  | PEMP (g) | 50.78 g | 7.27 g | 8.61 g |
|  | MET (g) |  | 36.26 g |  |
|  | SET (g) |  |  | 42.96 g |
|  | Near-infrared absorbent | 0.07 g (700 ppm) | 0.07 g (700 ppm) | 0.07 g (700 ppm) |
| Lens properties | Impact resistance E (J) | 3.35 J | 3.7 J | 5.5 J |
|  | Tg (° C.) | 84.6° C. | 85.0° C. | 78.38° C. |
|  | Index of refraction (nD) | 1.5928 | 1.5929 | 1.5490 |
|  | Abbe number ($v_d$)) | 48 | 40.9 | 39.8 |
|  | Appearance | Black Transparent | Black Transparent | Black Transparent |
|  | Transmittance (T %) (520 nm) | 27.2% (520 nm) | 26.8% (520 nm) | 35.3% (520 nm) |

Table 9 and FIGS. 5 to 7 show results of lens properties obtained when each of PEMP, MET and SET was used as a polythiol compound while the concentration of the near-infrared absorbent was fixed to 700 ppm. The lenses of Examples 10 to 12 had excellent near-infrared blocking efficiency and a good visible light transmittance of 26.8% to 35.5%, and in particular, had excellent impact resistance energies of 3.35 J, 3.7 J, and 5.5 J, respectively. In addition, even if the kind of polythiol included in the lenses is changed, it is expected that the lenses can be used as sunglasses due to high electromagnetic wave blocking efficiency thereof.

According to the present invention, experiments were performed while changing the index of refraction of a urethane resin such that the urethane resin became each of medium, high and ultrahigh refractivity resins. In addition, when the UV absorbent and the near-infrared absorbent according to the present invention were included in commercially available medium refractivity to ultrahigh refractivity monomer compositions, it was thought that the monomer compositions efficiently blocked harmful UV light and near-infrared light, had a visible light transmittance of 25.6% to 30.9% and thus could be sufficiently used for sunglasses. Thus, it could be seen that the near-infrared absorbent according to the present invention could be applied to various urethane optical lenses.

(Impartment of Additional Functions to Optical Lens)

The present invention is not limited to the embodiments set forth above. For example, a polarizing function (function transmitting light only at a specific angle and minimizing reflection light from a surface of a non-metallic object) and a dimming function (function enabling automatic control of illuminance by considering surrounding environments and space utilization) may be imparted to the polyurethane resin composition according to the present invention. Further, an eyesight correction function may be imparted particularly to an eyeglass lens.

Although described as being limited to an eyeglass lens, the polyurethane resin composition according to the present invention may be applied to large-area windows of sliding windows, double or single hung windows and casement windows, which are used in buildings and the like and require infrared absorption. To extend application of the polyurethane resin composition to the large-area windows, the polyurethane resin composition according to the present invention, which includes a phthalocyanine pigment, may be molded using various-shaped glass molds such that the polyurethane resin composition is fitted to a desired window frame, followed by curing the polyurethane resin composition. Next, the polyurethane resin composition may be released from the glass molds and used for large-area windows.

The invention claimed is:

1. An optical polymerizable composition composed of a polyurethane thermosetting resin and having excellent impact resistance, the optical polymerizable composition comprising:
   (1) a polyisocyanate mixture corresponding to a liquid (I) and comprising the following components (a), (b) and (c):
   (a) a biuret compound of an aliphatic isocyanate represented by Formula (1):

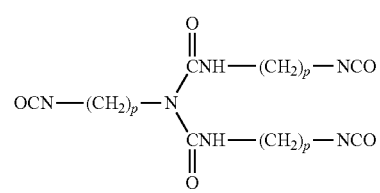

[Formula (1)]

where p is an integer of 2 to 10,
   (b) a compound of 1,6-hexamethylene diisocyanate; and
   (c) at least one diisocyanate compound selected from the group consisting of isophorone diisocyanate, dicyclohexylmethane diisocyanate, 2,5(6)-bis(isocyanatomethyl)-bicyclo[2,2,1]heptane, and octahydro-4,7-methano-1H-indenedimethyl diisocyanate; and
   (2) at least one polythiol selected from the group consisting of 2,3-bis(2-mercaptoethylthio)-propane-1-thiol, 3,6,10,13-tetrathiapentadecane-1,8,15-trithiol, pentaerythritol tetrakis(mercaptopropionate), 2-(2-mercaptoethylthio)propane-1,3-dithiol, and 4,8-dimercaptomethyl-1,11-dimercapto-3,6,9-trithiaundecane, the at least one polythiol being a polythiol compound corresponding to a liquid (II), and the polythiol compound is component (d), wherein the components (a), (b) and (c) of the polyisocyanate mixture are present in a weight ratio of 30 to 40:20 to 30:30 to 40, and an optical lens produced from the optical polymerizable composition has an impact resistance energy of 3.0 J to 6.7 J, wherein the polythiol compound used as the component (d) is a mixture of 2,3-bis(2-mercaptoethylthio)-propane-1-thiol and pentaerythritol tetrakis(mercaptopropionate), and wherein 2,3-bis(2-mercaptoethylthio)-propane-1-thiol and pentaerythritol tetrakis(mercaptopropionate) used as the component (d) are mixed in a ratio of 90 wt % to 80 wt %:10 wt % to 20 wt %.

2. The optical polymerizable composition according to claim 1, wherein the at least one diisocyanate compound used as the component (c) is isophorone diisocyanate, dicyclohexylmethane diisocyanate, or 2,5(6)-bis(isocyanatemethyl)-bicyclo[2,2,1]heptane.

3. The optical polymerizable composition according to claim 1, wherein a functional group of the polyisocyanate mixture NCO and a functional group of the polythiol SH are present in a mole ratio NCO/SH of 0.9 to 1.1.

4. The optical polymerizable composition according to claim 1, further comprising:

a near-infrared absorbent acting as an electromagnetic wave absorbent and having high near-infrared absorption capabilities corresponding to a transmittance of less than 5% at a wavelength of 800 nm to 1000 nm.

5. The optical polymerizable composition according to claim 4, wherein the near-infrared absorbent is a mixture of a plurality of phthalocyanine pigments having different structures, the pigments having a transmittance of less than 10% as minimum values of spectral transmittance curves in (i) a wavelength range of 800 nm to 850 nm, (ii) a wavelength range of 875 nm to 925 nm, and (iii) a wavelength range of 950 nm to 1000 nm, respectively.

6. The optical polymerizable composition according to claim 5, further comprising:

at least one UV absorbent acting as another electromagnetic wave absorbent, having absorption capabilities of UV light with a wavelength of 400 nm or less and selected from the group consisting of:

2-(2'-hydroxy-5-methylphenyl)-2H-benzotriazole; 2-(2'-hydroxy-3',5'-di-t-butylphenyl)-5-chloro-2H-benzotriazole; 2-(2'-hydroxy-3'-t-butyl-5'-methylphenyl)-5-chloro-2H-benzotriazole; 2-(2'-hydroxy-3',5'-di-t-amylphenyl)-2H-benzotriazole; 2-(2'-hydroxy-3',5'-di-t-butylphenyl)-2H-benzotriazole; 2-(2'-hydroxy-5'-t-butylphenyl)-2H-benzotriazole; 2-(2'-hydroxy-5'-t-octylphenyl)-2H-benzotriazole; 2,4-dihydroxybenzophenone; 2-hydroxy-4-methoxybenzophenone; 2-hydroxy-4-octyloxybenzophenone; 4-dodecyloxy-2-hydroxybenzophenone; 4-benzyloxy-2-hydroxybenzophenone; 2,2',4,4'-tetrahydroxybenzophenone; and 2,2'-dihydroxy-4,4'-dimethoxybenzophenone.

7. An optical composition for blocking electromagnetic waves, which is applied to a large-area window capable of blocking electromagnetic waves and is obtained from the optical polymerizable composition according to claim 6.

8. A large-area window produced from the optical composition for blocking electromagnetic waves according to claim 7, the large-area window being used as a sliding window, a double or single hung window, or a casement window.

9. An eyeglass lens produced from the optical polymerizable composition according to claim 4, the eyeglass lens further having a polarizing function, a dimming function, or a combination thereof.

10. An eyeglass lens produced from the optical polymerizable composition according to claim 5, the eyeglass lens further having a polarizing function, a dimming function, or a combination thereof.

11. An eyeglass lens produced from the optical polymerizable composition according to claim 6, the eyeglass lens further having a polarizing function, a dimming function, or a combination thereof.

* * * * *